US009519790B2

(12) United States Patent
Pruthi et al.

(10) Patent No.: US 9,519,790 B2
(45) Date of Patent: *Dec. 13, 2016

(54) EVALUATING CUSTOMER SECURITY PREFERENCES

(71) Applicant: Bank of America Corporation, Charlotte, NC (US)

(72) Inventors: Kapil Pruthi, Bothell, WA (US); Xianhong Zhang, Issaquah, WA (US); Tao Huang, Bellevue, WA (US); Raghav Shenoy, Charlotte, NC (US); Palash K. Shil, Concord, CA (US); Andy Keys, Albany, OR (US); Vikram Jalota, Bellvue, WA (US); Arul Arasu Madavadiyan, Bainbridge Island, WA (US)

(73) Assignee: Bank of America Corporation, Charlotte, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/015,341

(22) Filed: Feb. 4, 2016

(65) Prior Publication Data

US 2016/0154961 A1    Jun. 2, 2016

Related U.S. Application Data

(63) Continuation of application No. 14/262,630, filed on Apr. 25, 2014, now Pat. No. 9,286,467.

(51) Int. Cl.
G06F 21/00   (2013.01)
G06F 21/57   (2013.01)
(Continued)

(52) U.S. Cl.
CPC ............ *G06F 21/577* (2013.01); *G06F 21/41* (2013.01); *G06F 21/46* (2013.01);
(Continued)

(58) Field of Classification Search
CPC ........ G06F 21/577; G06F 21/46; G06F 21/41; G06F 2221/2103; G06F 2221/031; G06F 2221/034
See application file for complete search history.

(56) References Cited

U.S. PATENT DOCUMENTS

2011/0173077 A1   7/2011 Patel et al.
2011/0212700 A1   9/2011 Petite
(Continued)

*Primary Examiner* — Kendall Dolly
(74) *Attorney, Agent, or Firm* — Banner & Witcoff, Ltd.; Michael A. Springs

(57) ABSTRACT

Methods and systems for evaluating customer security preferences are presented. In some embodiments, a computer system may receive, from a security dashboard computing platform, a request for a security score associated with a customer. In response to receiving the request for the security score associated with the customer, the computer system may request, from a customer portal computing platform, one or more security preferences associated with the customer. Subsequently, the computer system may receive, from the customer portal computing platform, the one or more security preferences associated with the customer. The computer system then may determine, based on at least one security score definition file and based on the one or more security preferences associated with the customer, a security score for the customer. Thereafter, the computer system may provide, to the security dashboard computing platform, the determined security score for the customer.

20 Claims, 26 Drawing Sheets

(51) Int. Cl.
  *G06F 21/46*  (2013.01)
  *G06F 21/41*  (2013.01)

(52) U.S. Cl.
  CPC .. *G06F 2221/031* (2013.01); *G06F 2221/034* (2013.01); *G06F 2221/2103* (2013.01)

(56) References Cited

U.S. PATENT DOCUMENTS

| | | |
|---|---|---|
| 2011/0288877 A1 | 11/2011 | Ofek et al. |
| 2012/0054095 A1 | 3/2012 | Lesandro et al. |
| 2012/0069131 A1 | 3/2012 | Abelow |
| 2012/0116880 A1 | 5/2012 | Patel et al. |
| 2012/0123824 A1 | 5/2012 | Patel et al. |
| 2012/0150659 A1 | 6/2012 | Patel et al. |
| 2012/0215560 A1 | 8/2012 | Ofek et al. |
| 2013/0151349 A1 | 6/2013 | Patel et al. |
| 2013/0219156 A1 | 8/2013 | Sears |
| 2013/0227689 A1 | 8/2013 | Pietrowicz et al. |
| 2013/0238447 A1 | 9/2013 | Patel et al. |
| 2013/0238801 A1 | 9/2013 | Sheets et al. |
| 2013/0246189 A1 | 9/2013 | Patel et al. |
| 2013/0303109 A1 | 11/2013 | Petite |
| 2013/0342343 A1 | 12/2013 | Harring et al. |
| 2013/0346246 A1 | 12/2013 | Patel et al. |
| 2014/0012683 A1 | 1/2014 | Patel et al. |
| 2014/0018969 A1 | 1/2014 | Forbes, Jr. |
| 2014/0039699 A1 | 2/2014 | Forbes, Jr. |
| 2014/0039701 A1 | 2/2014 | Forbes, Jr. |
| 2014/0039703 A1 | 2/2014 | Forbes, Jr. |
| 2014/0040044 A1 | 2/2014 | Patel et al. |
| 2014/0085047 A1 | 3/2014 | Ambrefe, Jr. et al. |
| 2014/0104034 A1 | 4/2014 | Ambrefe, Jr. et al. |
| 2014/0114829 A1 | 4/2014 | Forbes, Jr. |
| 2014/0114844 A1 | 4/2014 | Forbes, Jr. |
| 2014/0114849 A1 | 4/2014 | Forbes, Jr. |
| 2014/0114850 A1 | 4/2014 | Forbes, Jr. |
| 2014/0122615 A1* | 5/2014 | Bechtel ............ G06F 17/30994 709/205 |
| 2014/0173738 A1* | 6/2014 | Condry ................ G06F 21/568 726/25 |
| 2014/0280217 A1* | 9/2014 | Stibel ............... G06F 17/30386 707/748 |
| 2014/0282977 A1* | 9/2014 | Madhu ................... H04L 63/12 726/7 |

\* cited by examiner

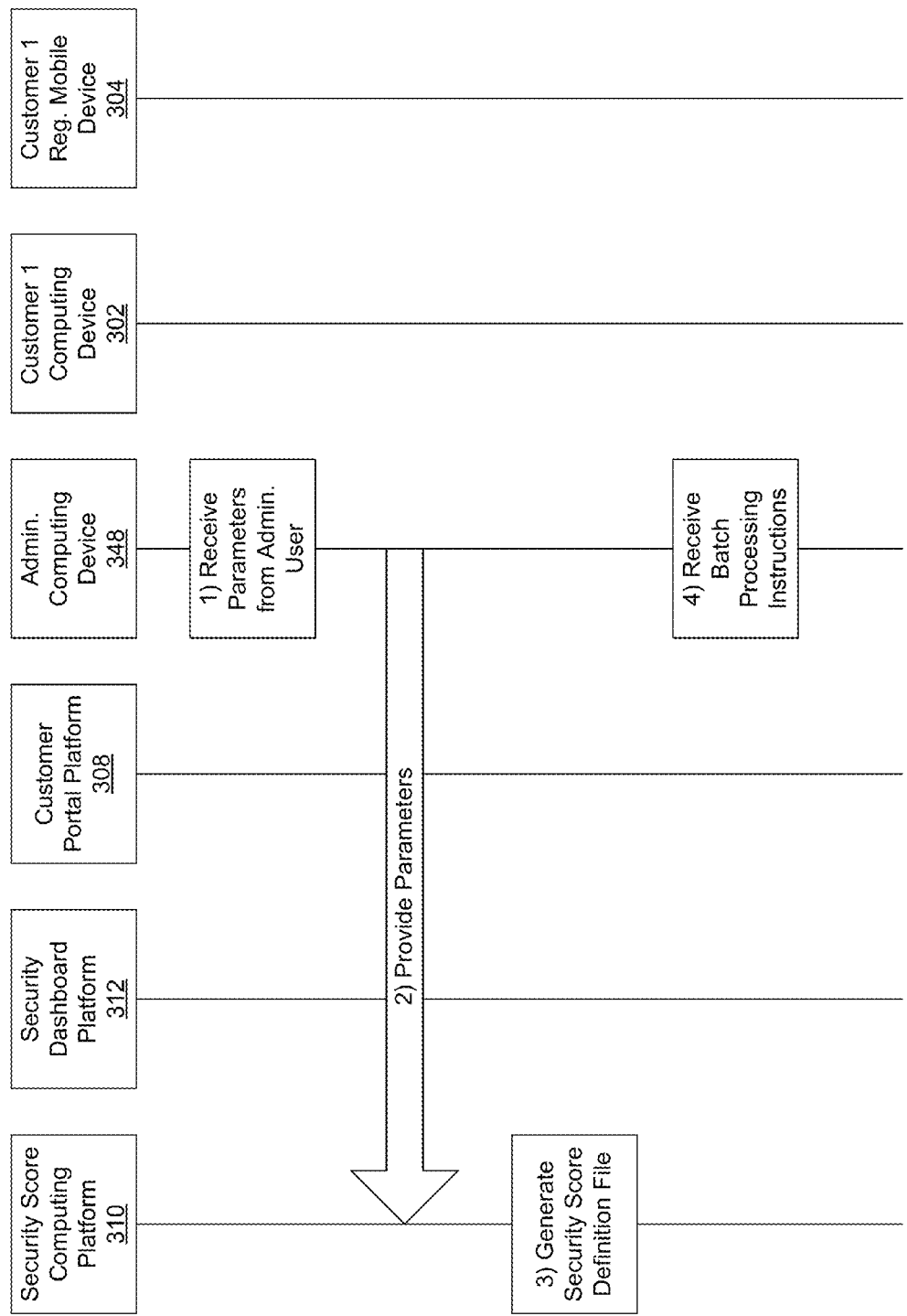

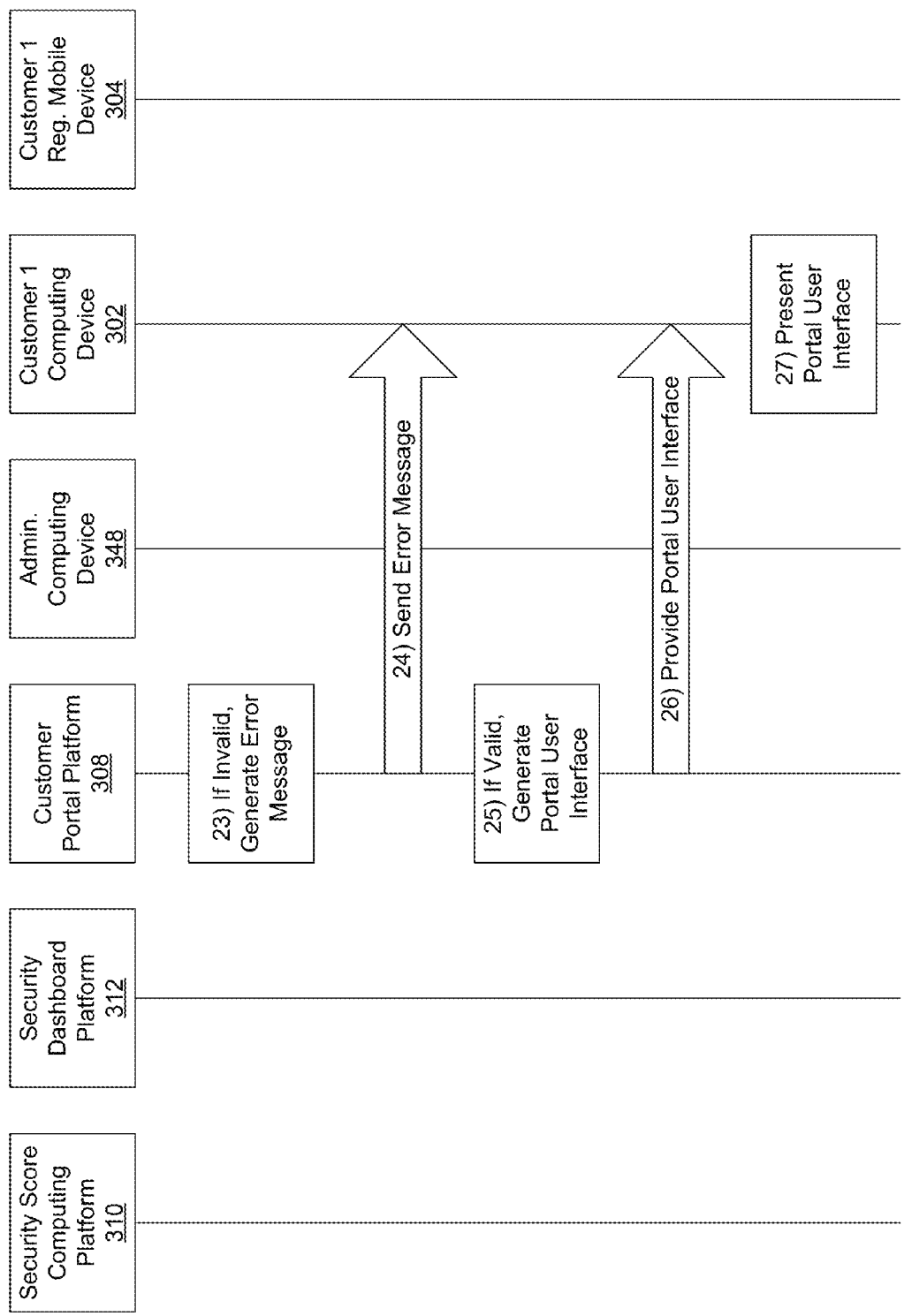

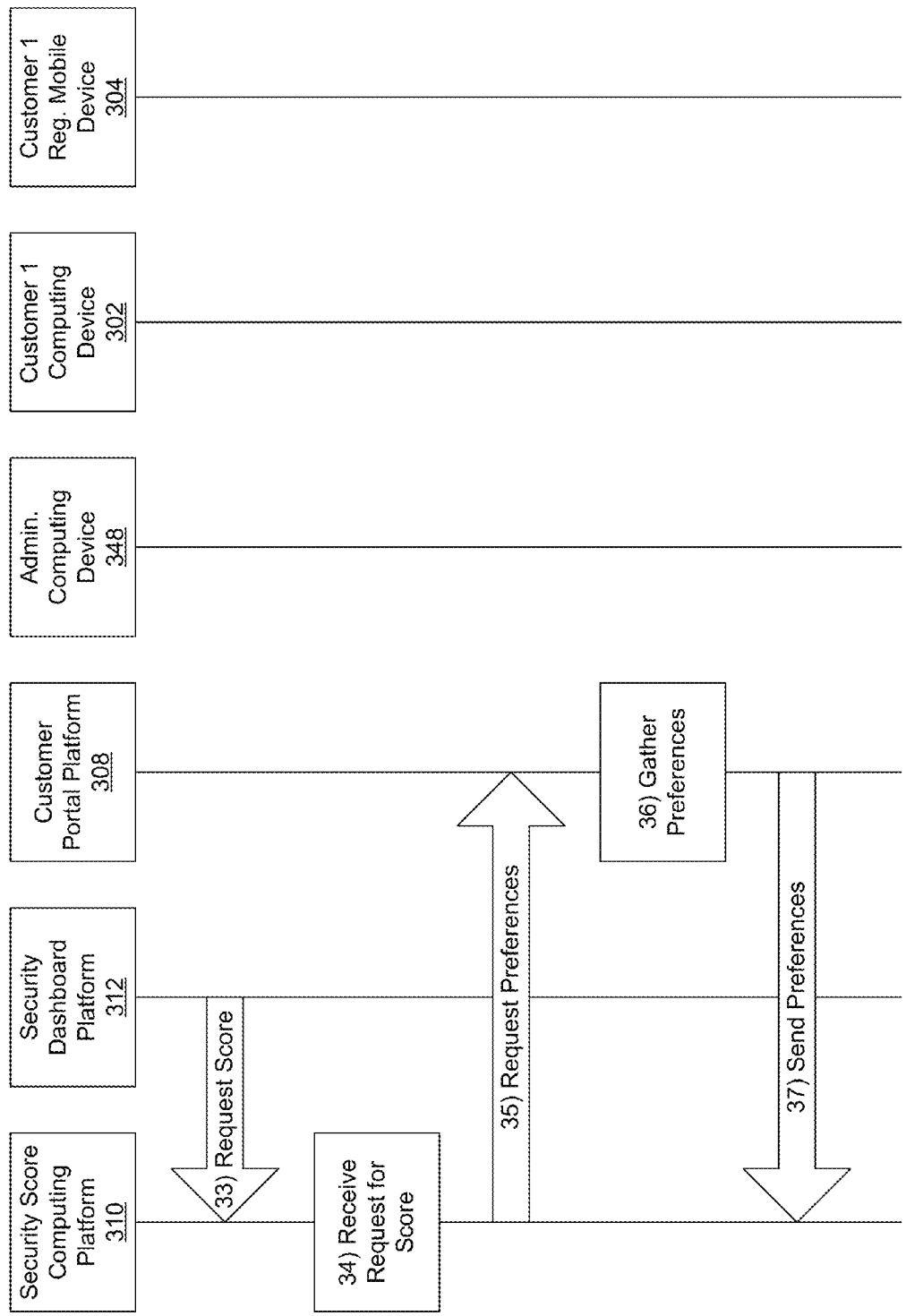

Online Banking

Accounts | Bill Pay | Transfers | Security Dashboard | Other Options

*Your Security & Devices Dashboard*

Dear customer: ~~~~~~~~~~~~~~~~~~~~~~~~~

| | | | |
|---|---|---|---|
| Password Strength: | 80% | Browser Security Plug-in: | Not installed |
| Password Changed: | Aug. 3, 2013 4:32 PM | Security Alerts: | Not enrolled |
| One-Time Passcode: | Not enabled | Shopping Protection: | Not enrolled |
| | | Biometrics: | Not enrolled |

Learning Center | Device Registration

Computer(s)        Alerts        Last Log-In        Options

FIG. 7

Login History     List view | Calendar View | Map View

*Date*    *Time*    *Location*    *IP*    *Mode*

12/06/2013 05:37p GMT   City, Country   X.X.X.X   Desktop

FIG. 8

Login History for Computer 1

*Date*    *Time*    *Location*    *IP*    *Mode*

12/06/2013 05:37p GMT   City, Country   X.X.X.X   Desktop

FIG. 9

EVALUATING CUSTOMER SECURITY PREFERENCES

CROSS-REFERENCE TO RELATED APPLICATIONS

This application claims the benefit of and is a continuation of U.S. patent application Ser. No. 14/262,630, filed Apr. 25, 2014, and entitled "EVALUATING CUSTOMER SECURITY PREFERENCES," which is incorporated by reference herein in its entirety.

BACKGROUND

Aspects of the disclosure relate to computer hardware and software. In particular, one or more aspects of the disclosure generally relate to computer hardware and software for evaluating customer security preferences.

Large organizations, such as financial institutions, may serve many customers, and increasingly, customers are using computing devices, particularly mobile computing devices, to interact with organizations about the products and/or services offered by such organizations. Some large organizations may even provide specialized websites and/or customer portals for their customers that allow customers to view and/or purchase various products and/or services online, conduct transactions, and view and/or manage one or more accounts. While large organizations may take many steps to ensure the security of customer information and/or customer accounts, these organizations may wish to continue pursuing ever greater levels of security in protecting customer information and/or customer accounts. In some instances, however, risks to the security of customer information and/or customer accounts may arise simply from providing these specialized websites, customer portals, and/or other ways of accessing information online.

SUMMARY

Aspects of the disclosure relate to various systems and techniques that provide effective, efficient, scalable, and convenient ways of increasing the security of customer information and customer accounts, particularly in ways that promote awareness among customers of their information security and encourage customers to take proactive steps to ensure the security of their online accounts.

In accordance with one or more embodiments, a security score computing platform having at least one processor, a memory, and a communication interface may receive, by the at least one processor via the communication interface, from a security dashboard computing platform, a request for a security score associated with a customer. In response to receiving the request for the security score associated with the customer, the security score computing platform may request, by the at least one processor via the communication interface, from a customer portal computing platform, one or more security preferences associated with the customer. Then, the security score computing platform may receive, by the at least one processor via the communication interface, from the customer portal computing platform, the one or more security preferences associated with the customer. Thereafter, the security score computing platform may determine, by the at least one processor, based on at least one security score definition file and based on the one or more security preferences associated with the customer, a security score for the customer. Subsequently, the security score computing platform may provide, by the at least one processor via the communication interface, to the security dashboard computing platform, the determined security score for the customer.

In some embodiments, prior to determining the security score for the customer, the security score computing platform may receive, by the at least one processor via the communication interface, from an administrative computing device, one or more security parameters for evaluating customer security preferences. Then, the security score computing platform may generate, by the at least one processor, based on the one or more security parameters for evaluating customer security preferences, the at least one security score definition file.

In some embodiments, the at least one security score definition file may specify one or more weighted criteria for evaluating customer security preferences. In some embodiments, the one or more weighted criteria may include at least one of: an indication of password strength; an indication of an amount of time elapsed since a password change event; an indication of whether a one-time passcode is required at login; an indication of whether a one-time passcode is required when responding to a challenge question; an indication of whether a customer account is enrolled in a security alert program; and an indication of whether a customer device is loaded with a browser security plug-in.

In some embodiments, the security score computing platform may receive, by the at least one processor via the communication interface, from an administrative computing device, one or more batch processing instructions for evaluating customer security preferences for a group of customers. Based on the one or more batch processing instructions, the security score computing platform may request, by the at least one processor via the communication interface, from the customer portal computing platform, one or more security preferences associated with the group of customers. Subsequently, the security score computing platform may receive, by the at least one processor via the communication interface, from the customer portal computing platform, the one or more security preferences associated with the group of customers. Based on the one or more batch processing instructions, the security score computing platform may determine, by the at least one processor, based on the at least one security score definition file and based on the one or more security preferences associated with the group of customers, at least one security score for each customer included in the group of customers. Thereafter, the security score computing platform may store, by the at least one processor, the at least one security score for each customer included in the group of customers.

In some embodiments, the one or more batch processing instructions may include a schedule for evaluating customer security preferences for at least one customer included in the group of customers. In some embodiments, the one or more batch processing instructions may include a schedule for determining an updated customer security score for at least one customer included in the group of customers.

In accordance with one or more other embodiments, a security dashboard computing platform having at least one processor, a memory, and a communication interface may receive, by the at least one processor via the communication interface, from a customer portal computing platform, a request for a security dashboard user interface for a customer. In response to receiving the request for the security dashboard user interface, the security dashboard computing platform may request, by the at least one processor via the communication interface, from a security score computing platform, a security score for the customer. Then, the security dashboard computing platform may receive, by the at least one processor via the communication interface, from the security score computing platform, the security score for the customer. Thereafter, the security dashboard computing platform may generate, by the at least one processor, based on the security score for the customer, the security dashboard user interface for the customer. Subsequently, the security dashboard computing platform may provide, by the at least one processor via the communication interface, to the customer portal computing platform, the generated security dashboard user interface for the customer.

In some embodiments, the security score for the customer may be determined based on one or more security preferences associated with the customer and one or more weighted criteria for evaluating customer security preferences. In some embodiments, the one or more weighted criteria may include at least one of: an indication of password strength; an indication of an amount of time elapsed since a password change event; an indication of whether a one-time passcode is required at login; an indication of whether a one-time passcode is required when responding to a challenge question; an indication of whether a customer account is enrolled in a security alert program; and an indication of whether a customer device is loaded with a browser security plug-in.

In some embodiments, the security dashboard user interface for the customer may include at least one region having a color-coded status indicator for each criterion of the one or more weighted criteria for evaluating customer security preferences. In addition, a state of the color-coded status indicator for each criterion of the one or more weighted criteria for evaluating customer security preferences may be determined based on a corresponding security preference of the one or more security preferences associated with the customer.

In some embodiments, the security dashboard user interface for the customer may include at least one region having login history information.

In some embodiments, the security dashboard user interface for the customer may include at least one region having a security score simulator. In some embodiments, the security score simulator may be configured to: receive user input adjusting at least one security preference of one or more security preferences associated with the customer; determine a revised security score for the customer based on the received user input; and update information included in the security dashboard user interface for the customer based on the revised security score for the customer.

In some embodiments, the security dashboard computing platform may receive, by the at least one processor via the communication interface, from the customer portal computing platform, a request for a mobile security dashboard user interface for a second customer. In response to receiving the request for the mobile security dashboard user interface, the security dashboard computing platform may request, by the at least one processor via the communication interface, from the security score computing platform, a security score for the second customer. Then, the security dashboard computing platform may receive, by the at least one processor via the communication interface, from the security score computing platform, the security score for the second customer. Thereafter, the security dashboard computing platform may generate, by the at least one processor, based on the security score for the second customer, the mobile security dashboard user interface for the second customer. Subsequently, the security dashboard computing platform may provide, by the at least one processor via the communication interface, to the customer portal computing platform, the generated mobile security dashboard user interface for the second customer.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which:

FIGS. 4A-4J depict an illustrative event sequence for evaluating customer security preferences in accordance with one or more example embodiments;

FIG. 7 depicts another example graphical user interface for presenting a security dashboard in accordance with one or more example embodiments;

FIG. 8 depicts an example graphical user interface for presenting login history information in accordance with one or more example embodiments;

FIG. 9 depicts an example graphical user interface for presenting device-specific login history information in accordance with one or more example embodiments;

DETAILED DESCRIPTION

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure.

It is noted that various connections between elements are discussed in the following description. It is noted that these connections are general and, unless specified otherwise, may be direct or indirect, wired or wireless, and that the specification is not intended to be limiting in this respect.

Figure 1:
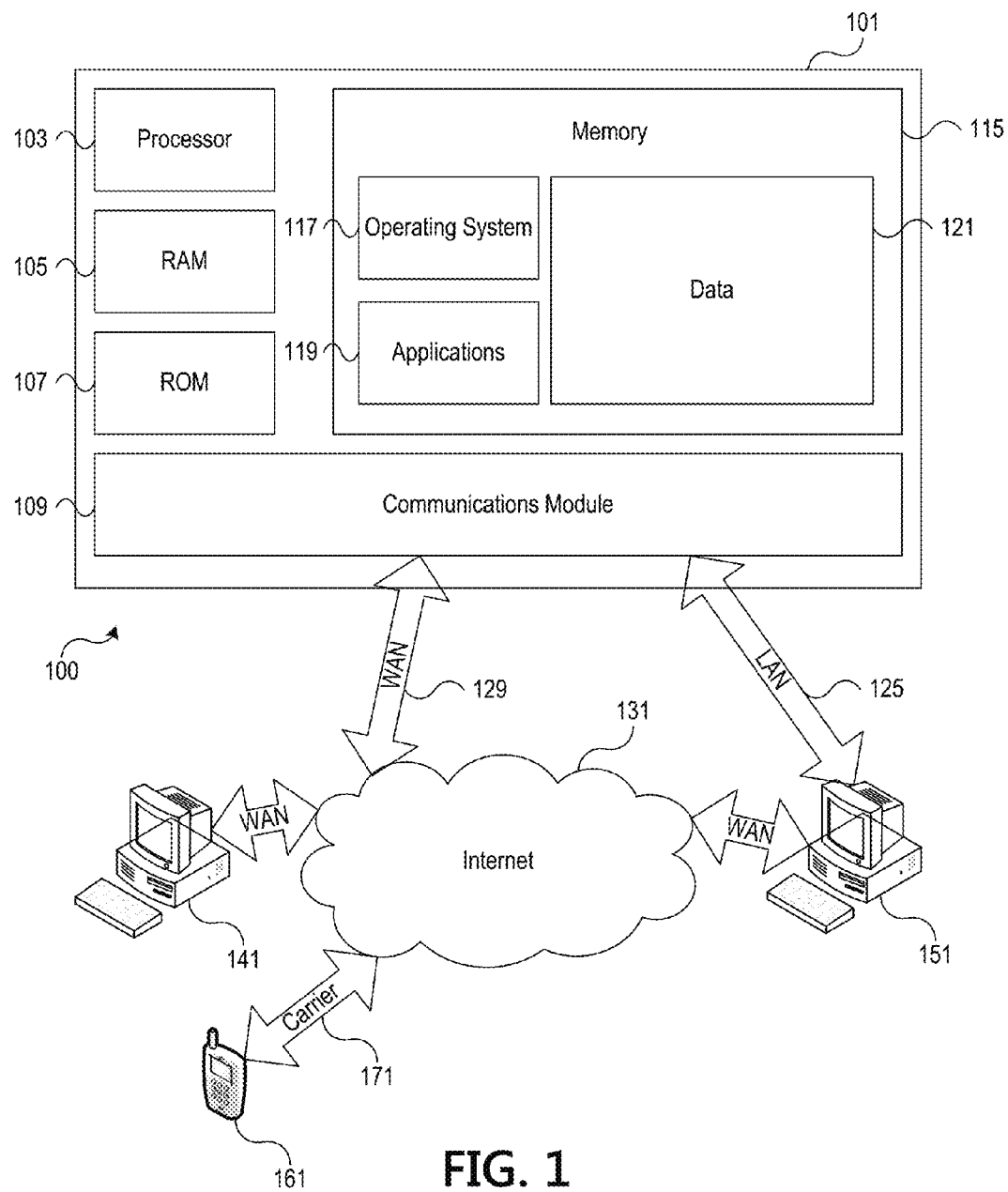
FIG. 1 depicts an illustrative operating environment in which various aspects of the disclosure may be implemented in accordance with one or more example embodiments.

FIG. 1 depicts an illustrative operating environment in which various aspects of the present disclosure may be implemented in accordance with one or more example embodiments. Referring to FIG. 1, computing system environment 100 may be used according to one or more illustrative embodiments. Computing system environment 100 is only one example of a suitable computing environment and is not intended to suggest any limitation as to the scope of use or functionality contained in the disclosure. Computing system environment 100 should not be interpreted as having any dependency or requirement relating to any one or combination of components shown in illustrative computing system environment 100.

Computing system environment 100 may include computing device 101 having processor 103 for controlling overall operation of computing device 101 and its associated components, including random-access memory (RAM) 105, read-only memory (ROM) 107, communications module 109, and memory 115. Computing device 101 may include a variety of computer readable media. Computer readable media may be any available media that may be accessed by computing device 101, may be non-transitory, and may include volatile and nonvolatile, removable and non-removable media implemented in any method or technology for storage of information such as computer-readable instructions, object code, data structures, program modules, or other data. Examples of computer readable media may include random access memory (RAM), read only memory (ROM), electronically erasable programmable read only memory (EEPROM), flash memory or other memory technology, compact disk read-only memory (CD-ROM), digital versatile disks (DVD) or other optical disk storage, magnetic cassettes, magnetic tape, magnetic disk storage or other magnetic storage devices, or any other medium that can be used to store the desired information and that can be accessed by computing device 101.

Although not required, various aspects described herein may be embodied as a method, a data processing system, or as a computer-readable medium storing computer-executable instructions. For example, a computer-readable medium storing instructions to cause a processor to perform steps of a method in accordance with aspects of the disclosed embodiments is contemplated. For example, aspects of the method steps disclosed herein may be executed on a processor on computing device 101. Such a processor may execute computer-executable instructions stored on a computer-readable medium.

Software may be stored within memory 115 and/or storage to provide instructions to processor 103 for enabling computing device 101 to perform various functions. For example, memory 115 may store software used by computing device 101, such as operating system 117, application programs 119, and associated database 121. Also, some or all of the computer executable instructions for computing device 101 may be embodied in hardware or firmware. Although not shown, RAM 105 may include one or more applications representing the application data stored in RAM 105 while computing device 101 is on and corresponding software applications (e.g., software tasks), are running on computing device 101.

Communications module 109 may include a microphone, keypad, touch screen, and/or stylus through which a user of computing device 101 may provide input, and may also include one or more of a speaker for providing audio output and a video display device for providing textual, audiovisual and/or graphical output. Computing system environment 100 may also include optical scanners (not shown). Exemplary usages include scanning and converting paper documents, e.g., correspondence, receipts, and the like, to digital files.

Computing device 101 may operate in a networked environment supporting connections to one or more remote computing devices, such as computing devices 141, 151, and 161. Computing devices 141, 151, and 161 may be personal computing devices or servers that include any or all of the elements described above relative to computing device 101. Computing device 161 may be a mobile device (e.g., smart phone) communicating over wireless carrier channel 171.

The network connections depicted in FIG. 1 may include local area network (LAN) 125 and wide area network (WAN) 129, as well as other networks. When used in a LAN networking environment, computing device 101 may be connected to LAN 125 through a network interface or adapter in communications module 109. When used in a WAN networking environment, computing device 101 may include a modem in communications module 109 or other means for establishing communications over WAN 129, such as Internet 131 or other type of computer network. The network connections shown are illustrative and other means of establishing a communications link between the computing devices may be used. Various well-known protocols such as transmission control protocol/Internet protocol (TCP/IP), Ethernet, file transfer protocol (FTP), hypertext transfer protocol (HTTP) and the like may be used, and the system can be operated in a client-server configuration to permit a user to retrieve web pages from a web-based server. Any of various conventional web browsers can be used to display and manipulate data on web pages.

The disclosure is operational with numerous other general purpose or special purpose computing system environments or configurations. Examples of well-known computing systems, environments, and/or configurations that may be suitable for use with the disclosed embodiments include, but are not limited to, personal computers (PCs), server computers, hand-held or laptop devices, smart phones, multiprocessor systems, microprocessor-based systems, set top boxes, programmable consumer electronics, network PCs, minicomputers, mainframe computers, distributed computing environments that include any of the above systems or devices, and the like.

Figure 2:
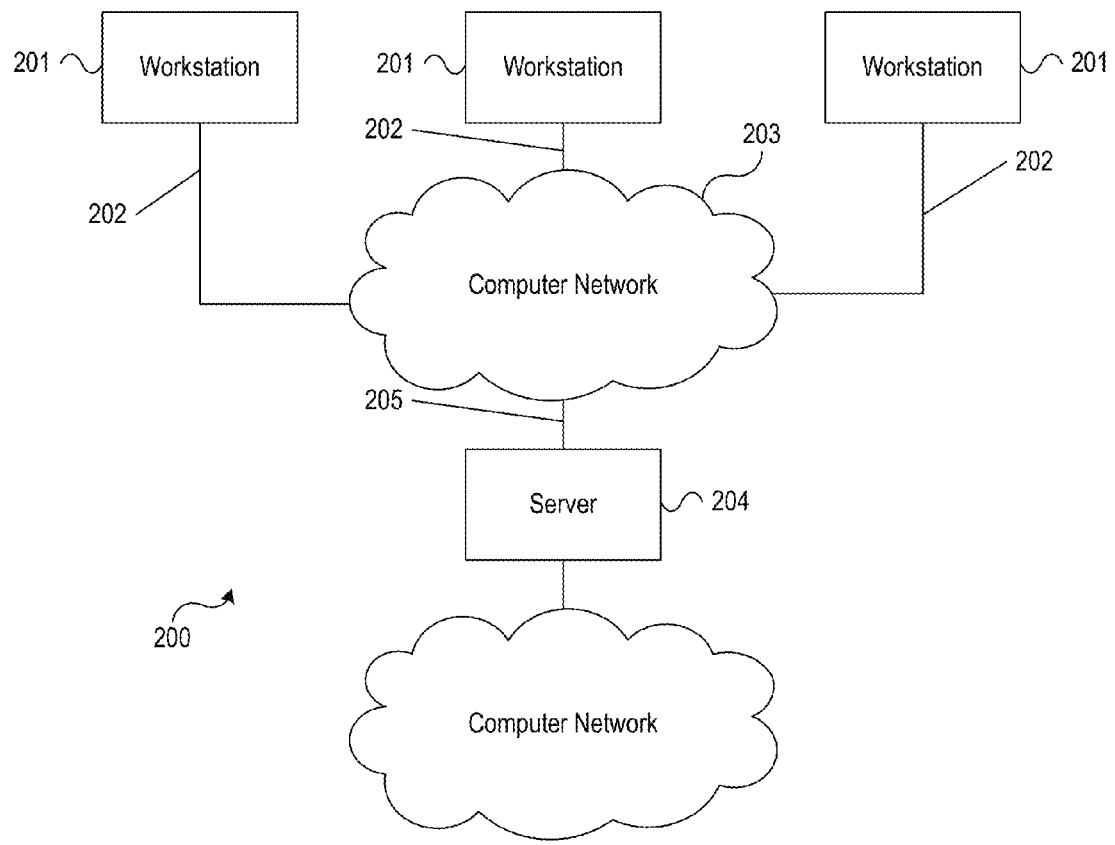
FIG. 2 depicts an illustrative block diagram of workstations and servers that may be used to implement the processes and functions of certain aspects of the present disclosure in accordance with one or more example embodiments.

FIG. 2 depicts an illustrative block diagram of workstations and servers that may be used to implement the processes and functions of certain aspects of the present disclosure in accordance with one or more example embodiments. Referring to FIG. 2, illustrative system 200 may be used for implementing example embodiments according to the present disclosure. As illustrated, system 200 may include one or more workstation computers 201. Workstation 201 may be, for example, a desktop computer, a smartphone, a wireless device, a tablet computer, a laptop computer, and the like. Workstations 201 may be local or remote, and may be connected by one of communications links 202 to computer network 203 that is linked via communications link 205 to server 204. In system 200, server 204 may be any suitable server, processor, computer, or data processing device, or combination of the same. Server 204 may be used to process the instructions received from, and the transactions entered into by, one or more participants.

Computer network 203 may be any suitable computer network including the Internet, an intranet, a wide-area network (WAN), a local-area network (LAN), a wireless network, a digital subscriber line (DSL) network, a frame relay network, an asynchronous transfer mode (ATM) network, a virtual private network (VPN), or any combination of any of the same. Communications links 202 and 205 may be any communications links suitable for communicating between workstations 201 and server 204, such as network links, dial-up links, wireless links, hard-wired links, as well as network types developed in the future, and the like.

Figure 3:
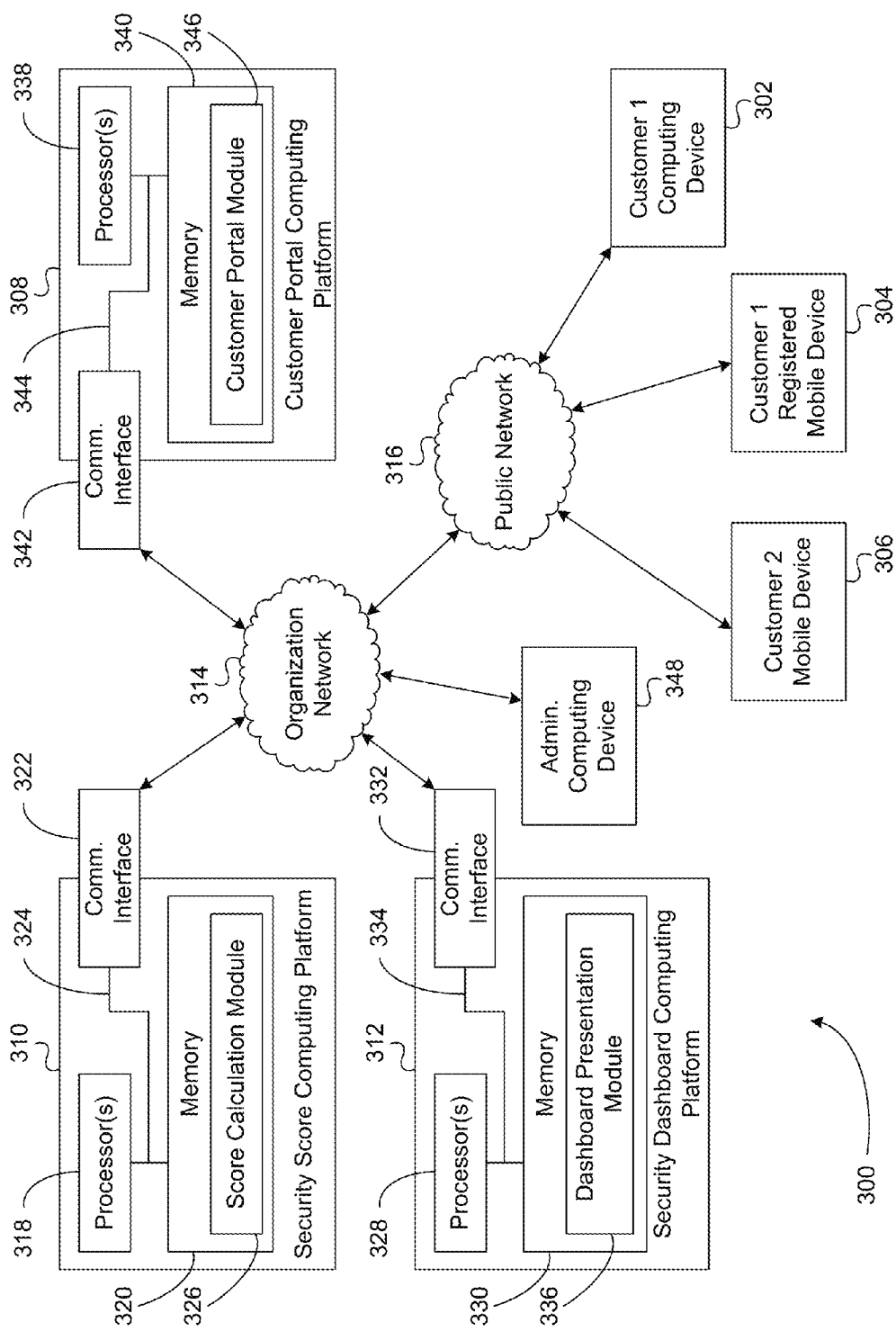
FIG. 3 depicts an illustrative computing environment for evaluating customer security preferences in accordance with one or more example embodiments.

FIG. 3 depicts an illustrative computing environment for evaluating customer security preferences in accordance with one or more example embodiments. Referring to FIG. 3, computing environment 300 may include one or more computing devices. For example, computing environment 300 may include a customer computing device 302 (which may, e.g., be used by a first customer), a registered mobile device 304 (which may, e.g., also be used by the first customer), another customer mobile device 306 (which may, e.g., be used by a second customer different from the first customer), and an administrative computing device 348. Customer computing device 302, registered mobile device 304, customer mobile device 306, and administrative computing device 348 may be any type of computing device capable of receiving a user interface, receiving input via the user interface, and communicating the received input to one or more other computing devices. For example, customer computing device 302, registered mobile device 304, customer mobile device 306, and/or administrative computing device 348 may be a desktop computer, laptop computer, tablet computer, smart phone, or the like. Computing environment 300 also may include one or more computing platforms. For example, computing environment 300 may include customer portal computing platform 308, security score computing platform 310, and security dashboard computing platform 312. Customer portal computing platform 308, security score computing platform 310, and security dashboard computing platform 312 may include one or more computing devices configured to perform one or more of the functions described herein. For example, customer portal computing platform 308, security score computing platform 310, and/or security dashboard computing platform 312 may include one or more computers (e.g., laptop computers, desktop computers, servers, server blades, or the like).

Computing environment 300 also may include one or more networks, which may interconnect one or more of customer computing device 302, registered mobile device 304, customer mobile device 306, administrative computing device 348, customer portal computing platform 308, security score computing platform 310, and/or security dashboard computing platform 312. For example, computing environment 300 may include organization network 314 and public network 316. Organization network 314 and/or public network 316 may include one or more sub-networks (e.g., LANs, WANs, or the like). Organization network 314 may be associated with a particular organization (e.g., a corporation, financial institution, educational institution, governmental institution, or the like) and may interconnect one or more computing devices associated with the organization. For example, customer portal computing platform 308, security score computing platform 310, security dashboard computing platform 312, and administrative computing device 348 may be associated with an organization (e.g., a financial institution), and organization network 314 may be associated with and/or operated by the organization, and may include one or more networks (e.g., LANs, WANs, VPNs, or the like) that interconnect customer portal computing platform 308, security score computing platform 310, security dashboard computing platform 312, and administrative computing device 348. Public network 316 may connect organization network 314 and/or one or more computing devices connected thereto (e.g., customer portal computing platform 308, security score computing platform 310, security dashboard computing platform 312, and/or administrative computing device 348) with one or more networks and/or computing devices that are not associated with the organization. For example, customer computing device 302, registered mobile device 304, and/or customer mobile device 306 might not be associated with an organization that operates and/or is associated with organization network 314, and public network 316 may include one or more networks (e.g., the Internet) that connect customer computing device 302, registered mobile device 304, and/or customer mobile device 306 to organization network 314 and/or one or more computing devices connected thereto (e.g., customer portal computing platform 308, security score computing platform 310, security dashboard computing platform 312, and/or administrative computing device 348).

Customer portal computing platform 308 may include one or more processor(s) 338, memory 340, communication interface 342, and data bus 344. Data bus 344 may interconnect processor(s) 338, memory 340, and/or communication interface 342. Communication interface 342 may be a network interface configured to support communication between customer portal computing platform 308 and organization network 314, or one or more sub-networks thereof. Memory 340 may include one or more program modules comprising instructions that when executed by the processor(s) 338 cause customer portal computing platform 308 to perform one or more functions described herein. For example, memory 340 may include customer portal module 346, which may comprise instructions that when executed by processor(s) 338 cause customer portal computing platform 308 to perform one or more functions described herein. Similarly, security score computing platform 310 may include one or more processor(s) 318, memory 320, communication interface 322, and data bus 324. Data bus 324 may interconnect processor(s) 318, memory 320, and/or communication interface 322. Communication interface 322 may be a network interface configured to support communication between security score computing platform 310 and organization network 314, or one or more sub-networks thereof. Memory 320 may include one or more program modules comprising instructions that when executed by the processor(s) 318 cause security score computing platform 310 to perform one or more functions described herein. For example, memory 320 may include security score calculation module 326, which may comprise instructions that when executed by processor(s) 318 cause security score computing platform 310 to perform one or more functions described herein. Similarly, security dashboard computing platform 312 may include one or more processor(s) 328, memory 330, communication interface 332, and data bus 334. Data bus 334 may interconnect processor(s) 328, memory 330, and/or communication interface 332. Communication interface 332 may be a network interface configured to support communication between security dashboard computing platform 312 and organization network 314, or one or more sub-networks thereof. Memory 330 may include one or more program modules comprising instructions that when executed by the processor(s) 328 cause security dashboard computing platform 312 to perform one or more functions described herein. For example, memory 330 may include dashboard presentation module 336, which may comprise instructions that when executed by processor(s) 328 cause security dashboard computing platform 312 to perform one or more functions described herein.

Figure 4B:
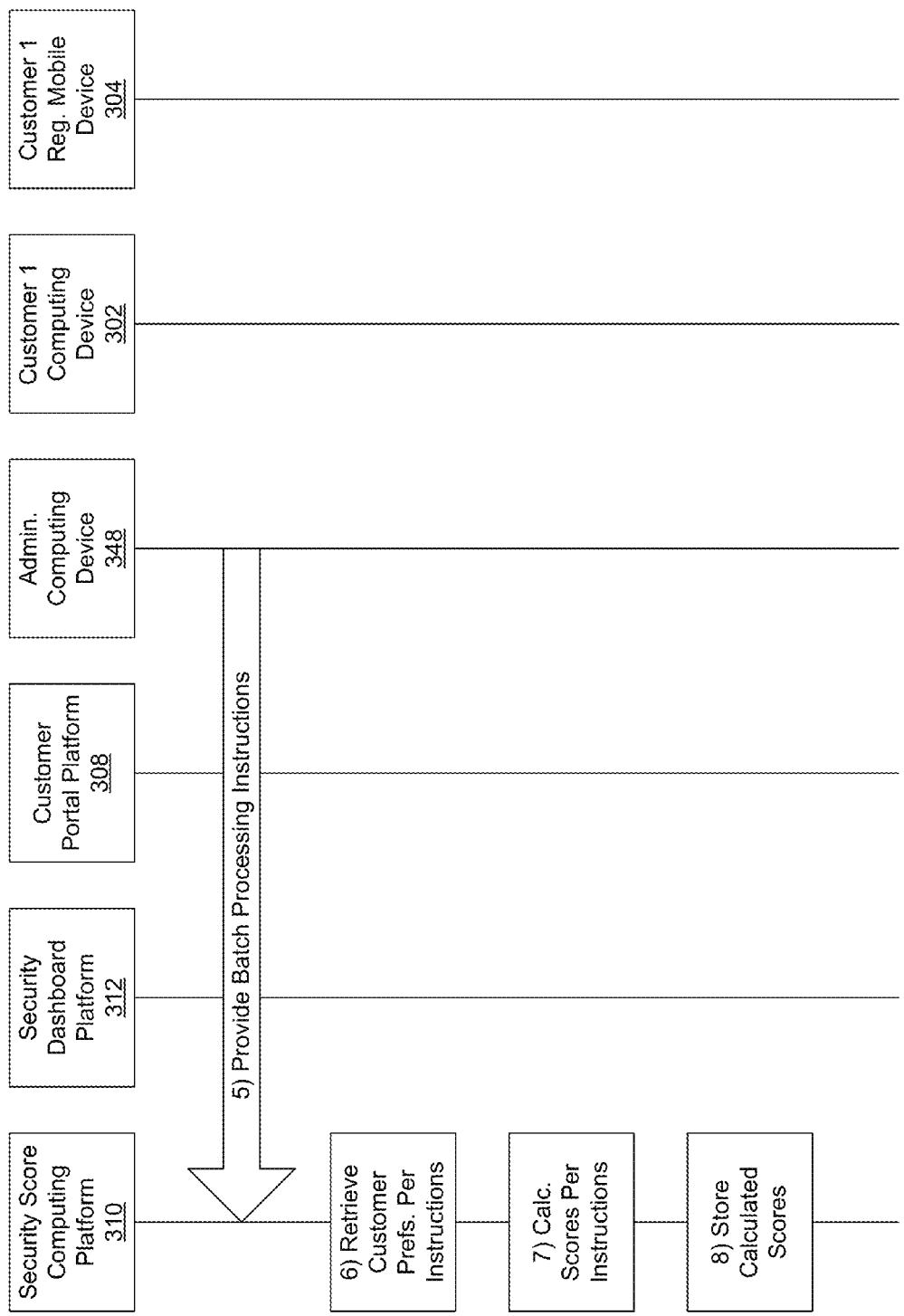
Figure 4C:
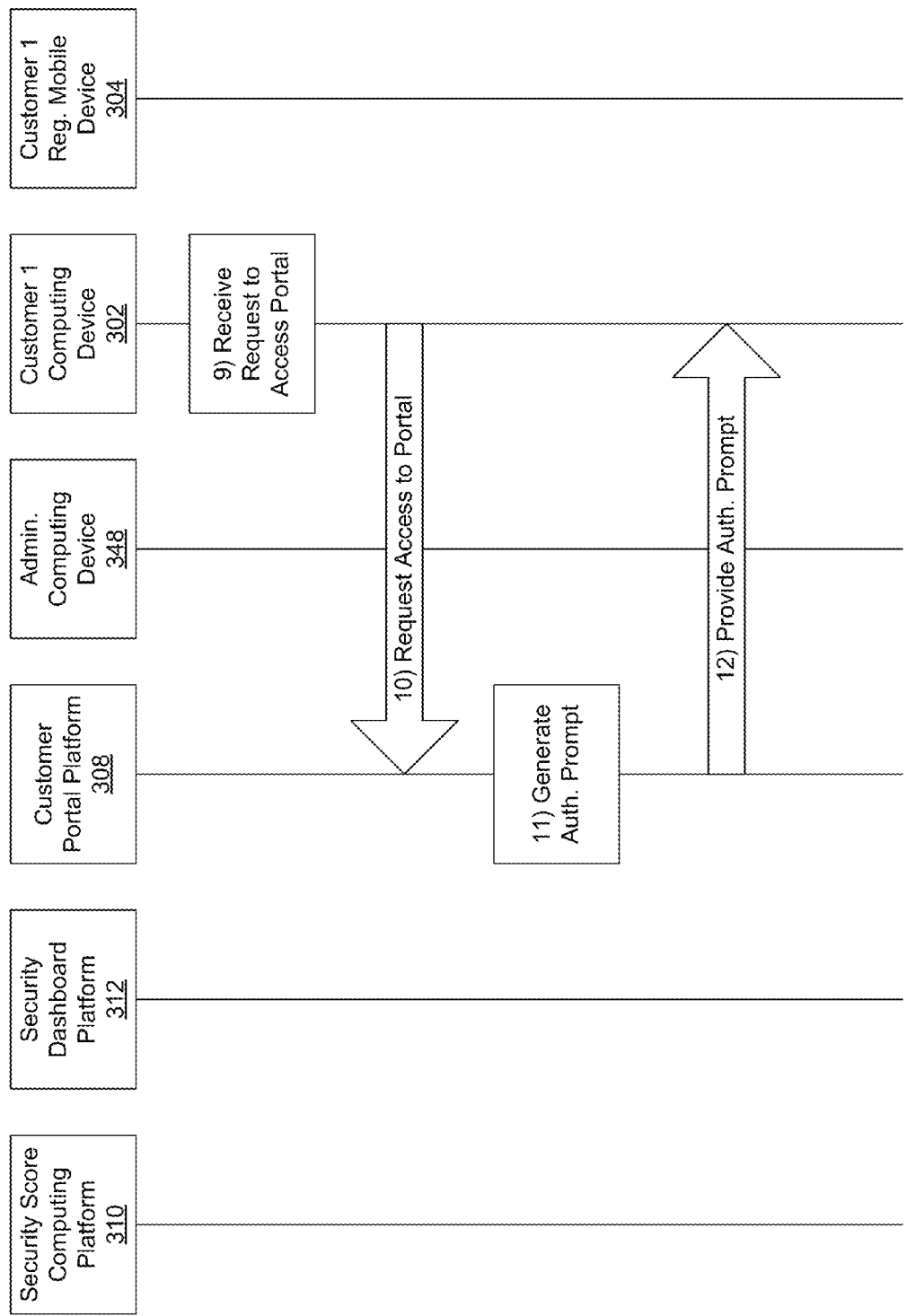
Figure 4D:
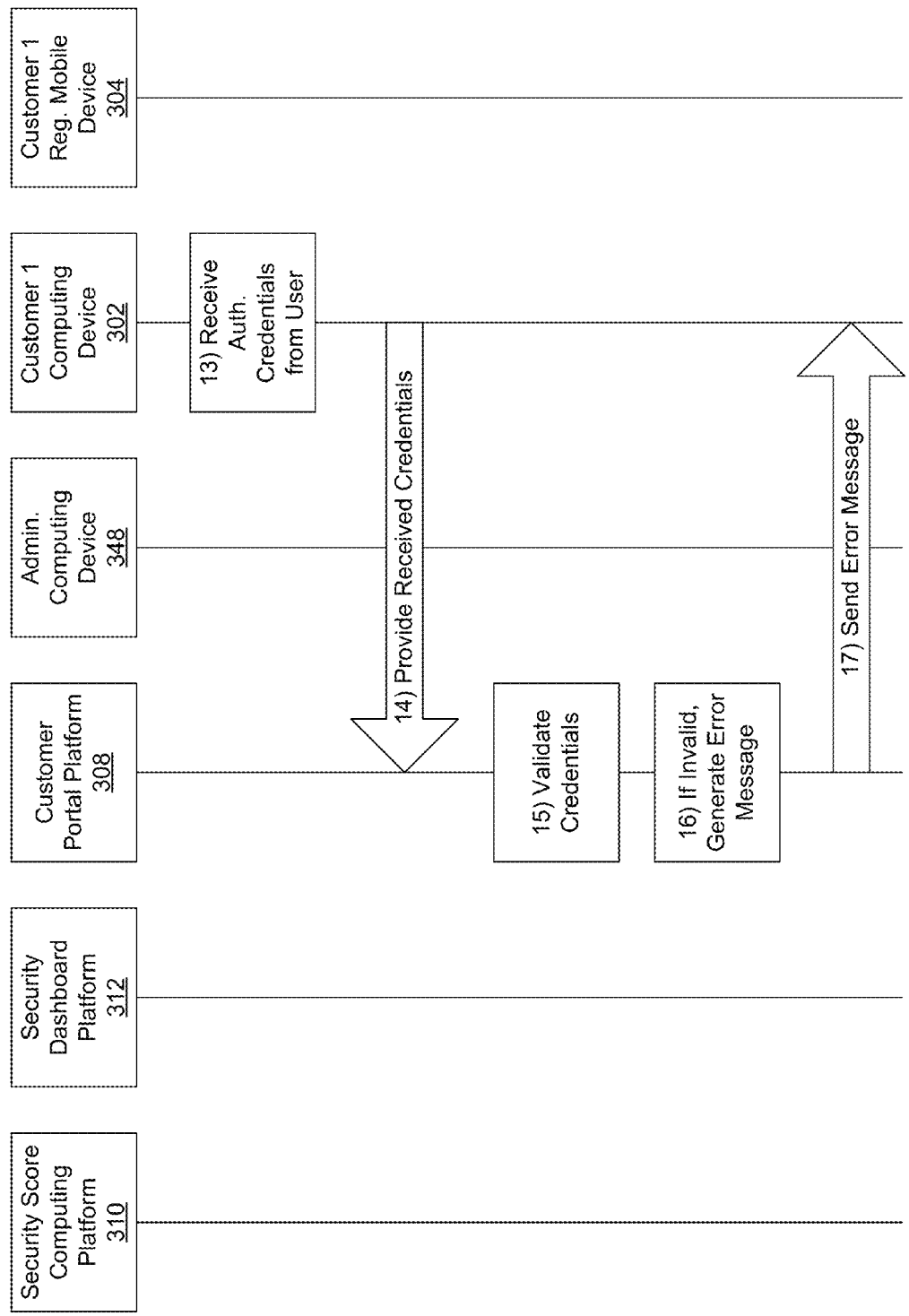
Figure 4E:
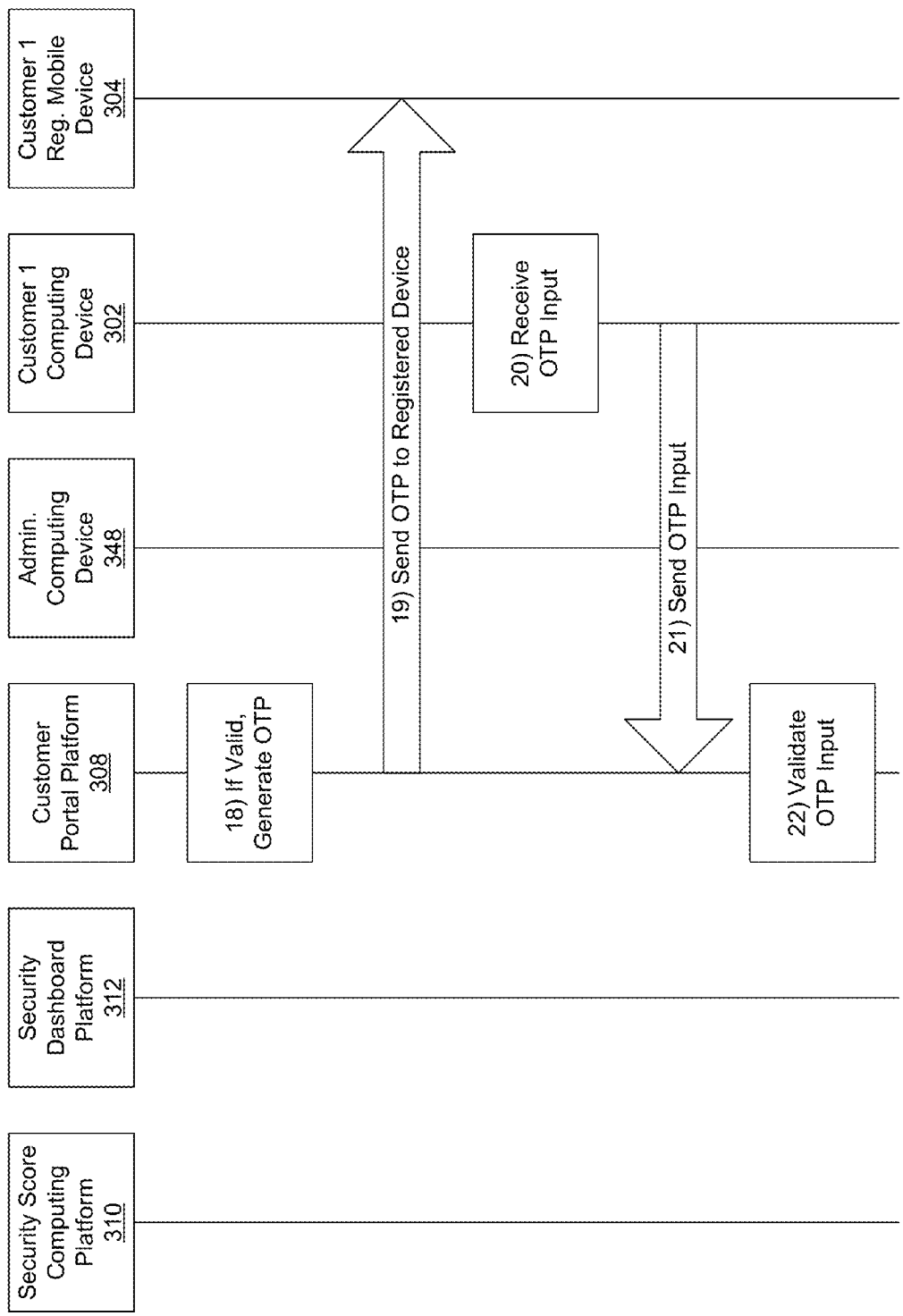
Figure 4G:
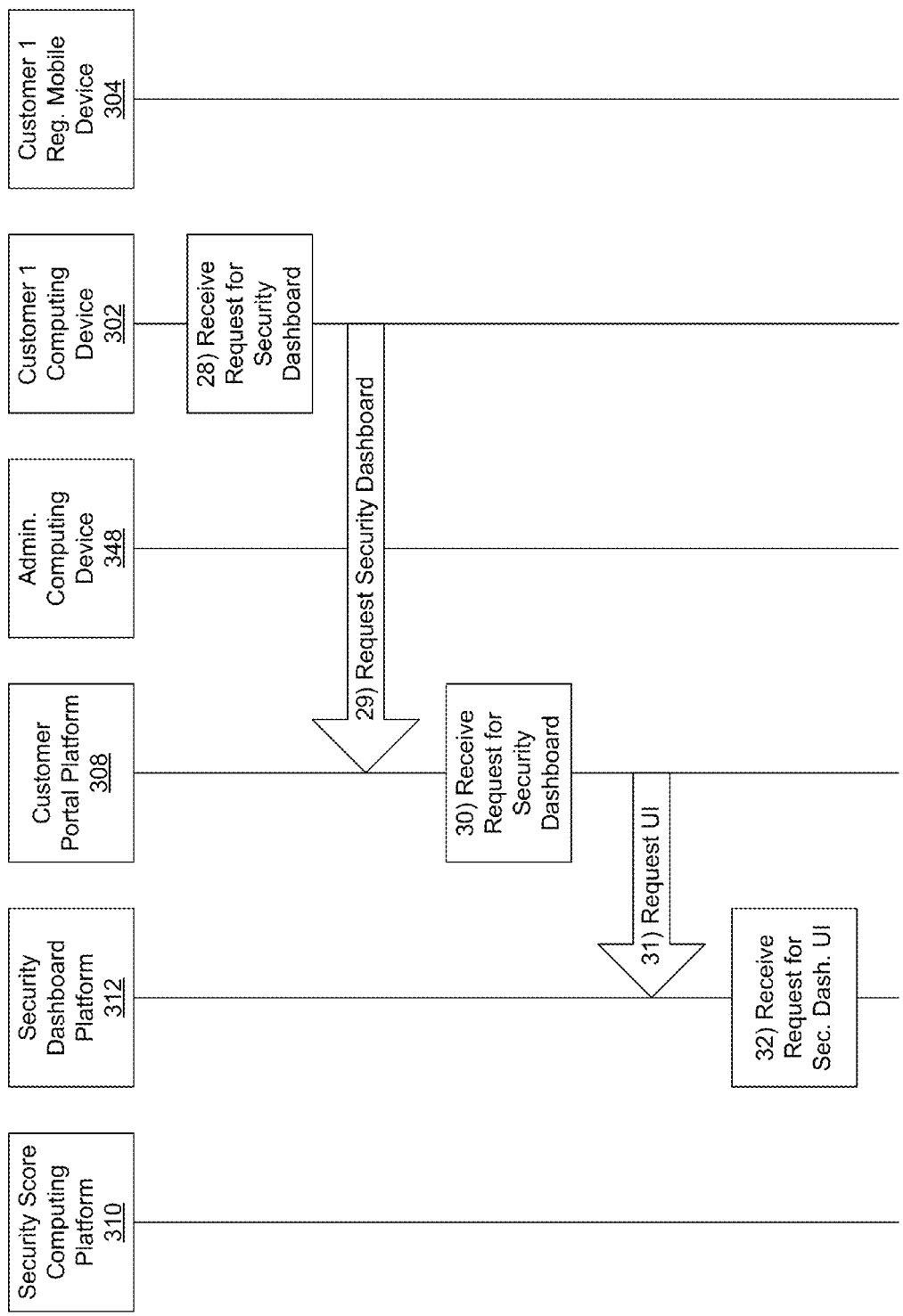
Figure 4I:
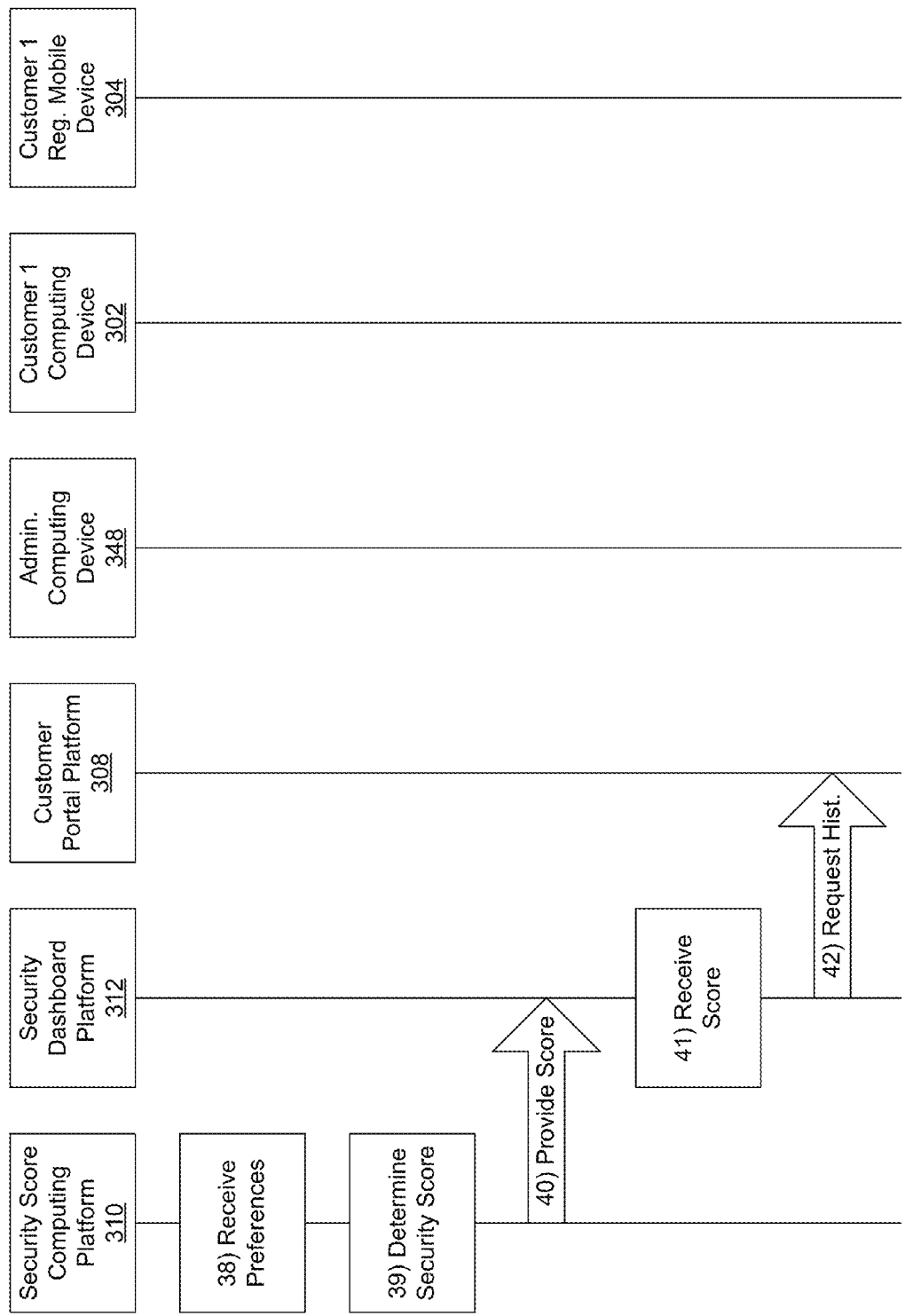
Figure 4J:
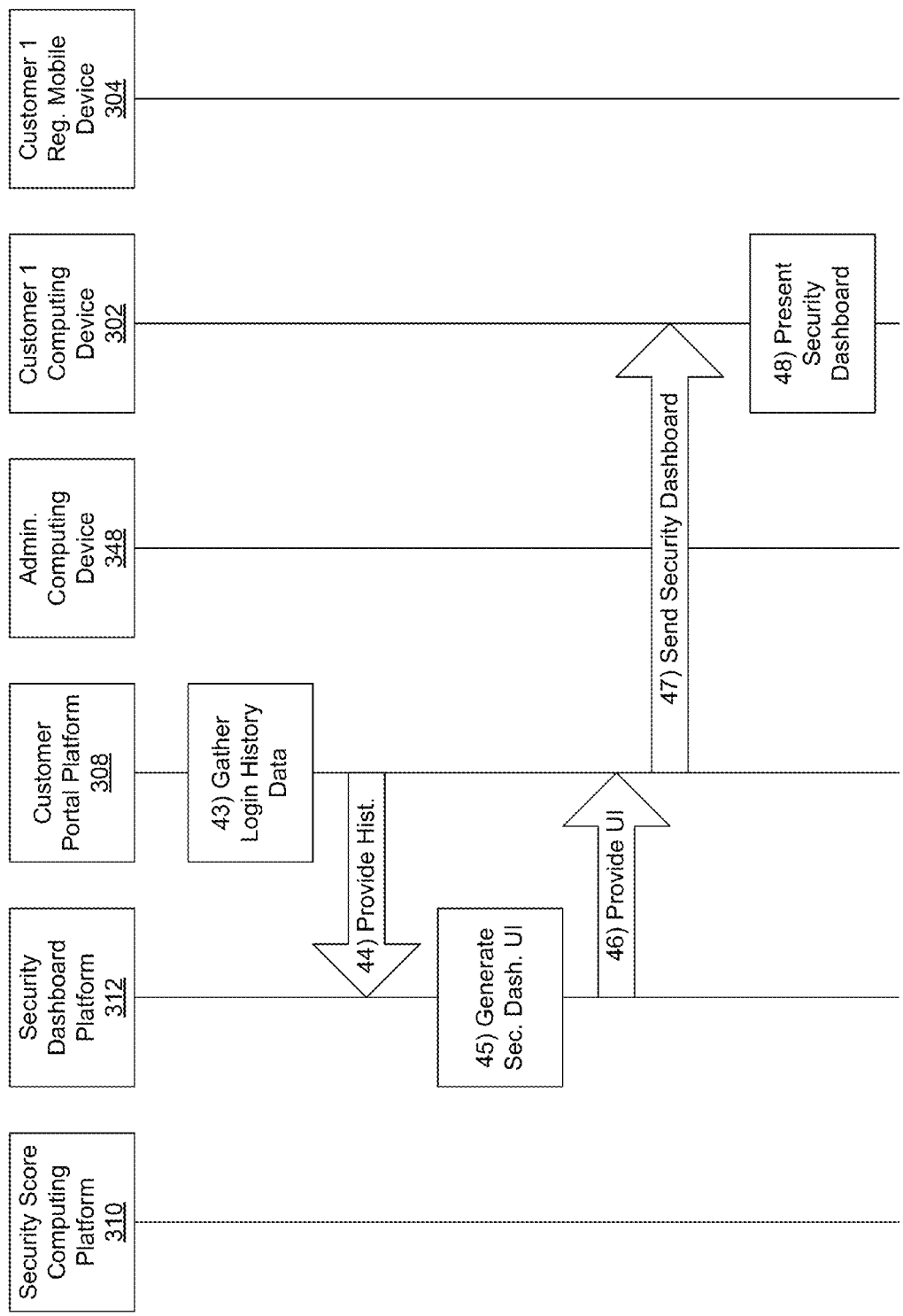

FIGS. 4A-4J depict an illustrative event sequence for evaluating customer security preferences in accordance with one or more example embodiments. Referring to FIG. 4A, at step 1, administrative computing device 348 may receive one or more security parameters for evaluating customer security preferences. The one or more security parameters for evaluating customer security preferences may, for example, be received from an administrative user via a graphical user interface provided by administrative computing device 348. In some instances, the one or more security parameters for evaluating customer security preferences may include weighted criteria for evaluating various customer security preferences. The weighted criteria may, for instance, include an indication of password strength (which may, e.g., be determined by one or more algorithms used in evaluating the complexity of a particular user's password), an indication of an amount of time elapsed since a password change event (which may, e.g., indicate the amount of time that has passed since a particular user last changed their password), an indication of whether a one-time passcode is required at login (which may, e.g., indicate whether a particular user has registered a mobile device to receive a one-time passcode when a login attempt occurs), an indication of whether a one-time passcode is required when responding to a challenge question (which may, e.g., indicate whether a particular user has registered a mobile device to receive a one-time passcode when a challenge question is presented), an indication of whether a customer account is enrolled in a security alert program (which may, e.g., indicate whether a particular user is enrolled in a program to receive and/or acknowledge security alerts associated with one or more of their accounts and/or one or more of their computing devices); and an indication of whether a customer device is loaded with a browser security plug-in (which may, e.g., indicate whether a particular user has downloaded and/or installed one or more specific plug-ins into their browser(s) on their various computing device(s)).

At step 2, administrative computing device 348 may provide the received security parameter(s) to security score computing platform 310. For example, in step 2, security score computing platform 310 may receive (e.g., via communication interface 322, from administrative computing device 348) one or more security parameters for evaluating customer security preferences. The one or more security parameters received by security score computing platform 310 may correspond to the one or more security parameters provided to administrative computing device 348 in step 1.

At step 3, security score computing platform 310 may generate at least one security score definition file based on the one or more security parameters for evaluating customer security preferences (e.g., as received from administrative computing device 348 in step 2). In some embodiments, the at least one security score definition file may specify one or more weighted criteria for evaluating customer security preferences. For example, the at least one security score definition file may specify that one or more of the weighted criteria discussed above are to be used when evaluating a specific customer's security preferences. In addition, and as discussed above, the one or more weighted criteria may, in some embodiments, include one or more of an indication of password strength, an indication of an amount of time elapsed since a password change event, an indication of whether a one-time passcode is required at login, an indication of whether a one-time passcode is required when responding to a challenge question, an indication of whether a customer account is enrolled in a security alert program, and/or an indication of whether a customer device is loaded with a browser security plug-in.

At step 4, administrative computing device 348 may receive one or more batch processing instructions for evaluating customer security preferences for a group of customers. The one or more batch processing instructions may, for example, be received from an administrative user via a graphical user interface provided by administrative computing device 348. In some instances, the one or more batch processing instructions may identify a group of customers (which may, e.g., include one or more customers of the organization) for whom security preferences are to be evaluated and/or other information, such as a schedule for evaluating and/or re-evaluating such security preferences for the identified customer(s). For example, in some embodiments, the one or more batch processing instructions may include a schedule for evaluating customer security preferences for at least one customer included in the group of customers. Such a schedule may identify the at least one customer in the group of customers to be evaluated and/or the specific time(s) and/or date(s) and/or frequency (e.g., hourly, daily, weekly, monthly, and so on) at which the at least one customer's security preferences are to be evaluated and/or re-evaluated. In some embodiments, the one or more batch processing instructions may additionally or alternatively include a schedule for determining an updated customer security score for at least one customer included in the group of customers. Such a schedule may similarly identify the at least one customer in the group of customers for which an updated customer security score is to be determined and/or the specific time(s) and/or date(s) and/or frequency (e.g., hourly, daily, weekly, monthly, and so on) at which the updated customer security score(s) is to be determined.

At step 5, administrative computing device 348 may provide the received batch processing instruction(s) to security score computing platform 310. For example, in step 5, security score computing platform 310 may receive (e.g., via communication interface 322, from administrative computing device 348) one or more batch processing instructions for evaluating customer security preferences for a group of customers. The one or more batch processing instructions received by security score computing platform 310 may correspond to the one or more batch processing instructions provided to administrative computing device 348 by an administrative user in step 4.

At step 6, security score computing platform 310 may retrieve customer preferences for one or more customers based on the batch processing instructions received in step 5. For example, in step 6, security score computing platform 310 may request (e.g., via communication interface 322, from customer portal computing platform 308) one or more security preferences associated with the group of customers identified by and/or otherwise associated with the batch processing instructions. After requesting such security preferences, the security score computing platform 310 may receive (e.g., via communication interface 322, from customer portal computing platform 308) and/or store information including the one or more security preferences associated with the group of customers. Such information may, for instance, include data specifying the selections made by specific customers included in the group of customers with respect to specific security preferences (which may, e.g., wholly or substantially correspond to the weighted criteria specified in the at least one security score definition file generated in step 3).

At step 7, security score computing platform 310 may calculate one or more security scores for one or more customers in accordance with the batch processing instructions. For example, in step 7, security score computing platform 310 may determine at least one security score for each customer included in the group of customers identified in the batch processing instructions. The security score computing platform 310 may determine the at least one security score for each customer based on the at least one security score definition file generated in step 3 and/or based on the one or more security preferences retrieved in step 6.

In determining a security score for a particular customer, security score computing platform 310 may, in one or more embodiments, use the one or more weighted criteria specified in the at least one security score definition file to evaluate the particular customer's security preferences and determine a numerical amount for the security score. For example, the at least one security score definition file may include the weighted criteria illustrated in Table A, below.

TABLE A

Example Criteria for Evaluating Customer Security Preferences

| Security Parameter | Status | Weightage | Action |
| --- | --- | --- | --- |
| Password Strength | Strong | 25 | |
| | Medium | 16 | Provide link to change password |
| | Weak | 8 | Provide link to change password |
| Time Elapsed Since Password Last Changed | Less than 60 days | 25 | |
| | Between 60 days and 90 days | 16 | Provide link to change password |
| | More than 90 days | 8 | Provide link to change password |
| One-time Passcode Required at Login | Enabled | 10 | |
| | Not Enabled | 0 | Provide link to add one-time passcode at sign-in page |
| One-time Passcode Required at Response to Challenge Question | Enabled | 10 | |
| | Not Enabled | 0 | Provide link to add one-time passcode at challenge question page |
| Security Alert Program | Enrolled | 15 | |
| | Not Enrolled | 0 | Provide link to enroll for security alerts |
| Browser Security Plug-in | Installed | 15 | |
| | Not Installed | 0 | Provide link to download and install browser security plug-in |

As seen in Table A, above, the weighted criteria included in the at least one security score definition file may specify various weightages for different statuses of one or more security parameters that may be evaluated by security score computing platform 310 in view of a particular customer's security preferences. In determining a security score for a particular customer, security score computing platform 310 thus may determine, based on the particular customer's security preferences, the state or status of each security parameter identified in the at least one security score definition file. Then, security score computing platform 310 may determine a parameter score for each security parameter based on the determined state or status of each security parameter and the corresponding weightage specified in the at least one security score definition file. Security score computing platform 310 may then calculate the security score for the customer by summing the parameter scores for each of the security parameters identified in the at least one security score definition file. In some instances, security score computing platform 310 may additionally or alternatively execute and/or cause to be executed one or more actions that may be identified in the at least one security score definition file based on the determined state or status of each security parameter.

As an example, if a security score definition file being used by security score computing platform 310 includes the weighted criteria illustrated in Table A, above, and if an example customer has a "medium" strength password, last changed their password more than 90 days ago, does not have one-time passcode features enabled at login prompts or at challenge question prompts, has enrolled to receive security alerts, and does not have a browser security plug-in installed, security score computing platform 310 may determine the security score for this example customer to be "39" (e.g., 16+8+0+0+15+0). In addition, security score computing platform 310 may execute and/or cause to be executed one or more actions identified in the security score definition file based on the determined state or status of each security parameter. In this example, security score computing platform 310 thus may cause: a link to be provided to the customer to change his or her password; a link to be provided to the customer to add one-time passcode features to his or her sign-in page(s); a link to be provided to the customer to add one-time passcode features to his or her challenge question page(s); and/or a link to be provided to the customer to enable the customer to download and install a browser security plug-in.

At step 8, security score computing platform 310 may store the one or more security scores calculated in step 7. For example, in step 8, security score computing platform 310 may store the at least one security score for each customer included in the group of customers identified in the batch processing instructions.

At step 9, customer computing device 302 may receive a request to access a customer portal. The request to access the customer portal may, for example, be received from a user of customer computing device 302. In one or more arrangements, the customer portal may be a website, and the request may be received by customer computing device 302 as a result of the user of customer computing device 302 entering and/or otherwise requesting a network address (e.g., a uniform resource locator (URL)) corresponding to the customer portal. Additionally or alternatively, the request to access the customer portal may be received via a web browser provided by customer computing device 302 and/or via one or more other graphical user interfaces provided by customer computing device 302.

At step 10, customer computing device 302 may send a request to access the customer portal to customer portal computing platform 308. The request may, for example, be communicated by customer computing device 302 to customer portal computing platform 308 via public network 316 and/or organization network 314. In response to receiving the request to access the customer portal, customer portal computing platform 308 may generate an authentication prompt at step 11. Such an authentication prompt may, for example, prompt an individual to provide a username, password, and/or other information to gain access to the customer portal, and the authentication prompt may be presented as and/or embedded in a webpage generated and/or served by customer portal computing platform 308. At step 12, customer portal computing platform 308 may provide the authentication prompt to customer computing device 302. For example, customer portal computing platform 308 may, in step 12, communicate the authentication prompt generated in step 11 to customer computing device 302 to facilitate authentication of the user of customer computing device 302.

At step 13, customer computing device 302 may receive one or more authentication credentials from a user of customer computing device 302. For example, in step 13, customer computing device 302 may receive and present the authentication prompt provided by customer portal computing platform 308, and the one or more authentication credentials may be received by customer computing device 302 from the user of customer computing device 302 in response to presenting the authentication prompt. At step 14, customer computing device 302 may provide the received authentication credentials to customer portal computing platform 308.

At step 15, customer portal computing platform 308 may validate the authentication credentials received from customer computing device 302. In validating the received authentication credentials, customer portal computing platform 308 may compare the received authentication credentials with one or more valid sets of credentials to identify and authenticate the user of customer computing device 302. If customer portal computing platform 308 determines that the received authentication credentials are invalid (e.g., in step 15), then at step 16, customer portal computing platform 308 may generate an error message, and at step 17, customer portal computing platform 308 may send the generated error message to customer computing device 302.

Alternatively, if customer portal computing platform 308 determines that the received authentication credentials are valid (e.g., in step 15), then at step 18, customer portal computing platform may generate a one-time passcode. The one-time passcode may, for example, include a string of alphanumeric characters that may be randomly generated by the customer portal computing platform 308 for use in authenticating the user of customer computing device 302. At step 19, customer portal computing platform 308 may send the generated one-time passcode to registered mobile device 304. Registered mobile device 304 may, for example, be a smart phone, tablet computer, or other mobile computing device that an authorized user of customer computing device 302 and/or of one or more accounts accessible via customer portal computing platform 308 previously registered with customer portal computing platform 308 for verification in authentication processes. Additionally or alternatively, customer portal computing platform 308 may send the generated one-time passcode to registered mobile device 304 via text message, electronic mail, push notification, and/or using other communication methods.

At step 20, customer computing device 302 may one-time passcode input. The one-time passcode input may, for example, be received from a user of customer computing device 302 and may include a transcription of the one-time passcode sent to registered mobile device 304. For instance, after registered mobile device 304 receives and/or displays the one-time passcode provided by customer portal computing platform 308 in step 19, the user of both customer computing device 302 and registered mobile device 304 may view the one-time passcode on registered mobile device 304 and enter it into customer computing device 302 (e.g., via one or more graphical user interfaces) to provide the one-time passcode input received by customer computing device 302 in step 20. At step 21, customer computing device 302 may provide the one-time passcode input to customer portal computing platform 308 for validation.

At step 22, customer portal computing platform 308 may validate the one-time passcode input received from customer computing device 302. In validating the one-time passcode input, customer portal computing platform 308 may compare the received one-time passcode input with the one-time passcode sent to registered mobile device 304 to confirm that the received one-time passcode input matches the one-time passcode sent to registered mobile device 304. If customer portal computing platform 308 determines that the received one-time passcode input is invalid (e.g., in step 23), then at step 23, customer portal computing platform 308 may generate an error message, and at step 24, customer portal computing platform 308 may send the generated error message to customer computing device 302.

Alternatively, if customer portal computing platform 308 determines that the received one-time passcode input is valid (e.g., in step 23), then at step 25, customer portal computing platform may generate a customer portal user interface. The customer portal user interface may, for example, include one or more webpages and/or other user interfaces that may enable a user of customer computing device 302 to access, view, and/or edit various types of information. In one or more arrangements, the customer portal user interface may include one or more online banking user interfaces that may enable a user of customer computing device 302 to access, view, and/or manage one or more financial accounts that may be maintained by a financial institution. For example, the customer portal user interface may include one or more online banking user interfaces that enable the user of customer computing device 302 to view account balances, transfer funds between accounts, pay bills, conduct other transactions, and/or otherwise view and/or manage one or more accounts that may be maintained by the financial institution.

At step 26, customer portal computing platform 308 may provide the customer portal user interface to customer computing device 302. In providing the customer portal user interface to customer computing device 302, customer portal computing platform 308 may, for example, serve one or more static and/or dynamic web pages to customer computing device 302. At step 27, customer computing device 302 may present the customer portal user interface received from customer portal computing platform 308. In presenting the customer portal user interface, customer computing device 302 may, for example, display the customer portal user interface and/or cause the user interface to be displayed (e.g., in a web browser and/or using other software on the customer computing device 302).

At step 28, customer computing device 302 may receive a request to access a security dashboard. Such a request may, for example, be received by customer computing device 302 as user input that includes a selection of a link, button, or other control included in the customer portal user interface. At step 29, after receiving the request to access the security dashboard, customer computing device 302 may request a security dashboard from customer portal computing platform 308.

At step 30, customer portal computing platform 308 may receive the request for a security dashboard from customer computing device 302. At step 31, customer portal computing platform 308 may request a security dashboard user interface from security dashboard computing platform 312. In requesting the security dashboard user interface from security dashboard computing platform 312, customer portal computing platform 308 may provide information identifying the customer using customer computing device 302 (which may, e.g., have been determined and/or stored by customer portal computing platform 308 during the identification and/or authentication of the user of customer computing device 302 discussed above) to security dashboard computing platform 312. The information identifying the customer using customer computing device 302 may, for example, be used by security dashboard computing platform 312 in generating a security dashboard user interface for the customer that includes customer-specific information, such as account information that is specific to the customer.

At step 32, security dashboard computing platform 312 may receive the request for a security dashboard user interface from customer portal computing platform 308. For example, in step 32, security dashboard computing platform 312 may receive (e.g., via communication interface 332, from customer portal computing platform 308) a request for a security dashboard user interface for a customer. The request for the security dashboard user interface may, for example, include information identifying the customer for which the security dashboard user interface is to be generated, and such information may include information identifying the customer using customer computing device 302.

At step 33, security dashboard computing platform 312 may request a security score from security score computing platform 310. For example, in response to receiving the request for the security dashboard interface for a customer (e.g., in step 32), security dashboard computing platform 312 may, in step 33, request (e.g., via communication interface 332, from security score computing platform 310) a security score for the customer. In requesting the security score for the customer, security dashboard computing platform 312 may embed in the request and/or otherwise send to security score computing platform 310 information identifying the customer for which the security score is being requested, such as a username, one or more account numbers, and/or one or more other identifiers associated with the customer.

At step 34, security score computing platform 310 may receive the request for a security score for the customer from security dashboard computing platform 312. For example, in step 34, security score computing platform 310 may receive (e.g., via communication interface 322, from security dashboard computing platform 312) a request for a security score associated with a customer. The request for the security score may, for example, include information identifying the customer for which the security score is being requested, such as a username, one or more account numbers, and/or one or more other identifiers associated with the customer.

At step 35, security score computing platform 310 may request information about the customer's security preferences from customer portal computing platform 308. For example, in response to receiving the request for the security score associated with the customer (e.g., in step 34), security score computing platform 310 may request (e.g., via communication interface 322, from customer portal computing platform 308) one or more security preferences associated with the customer. The one or more security preferences requested by security score computing platform 310 from customer portal computing platform 308 may, for example, correspond to the one or more weighted criteria for evaluating customer security preferences specified in the at least one security score definition file (which, e.g., may have been generated by security score computing platform 310 in step 3 above).

At step 36, customer portal computing platform 308 may gather information about one or more security preferences for the customer (e.g., based on the request received from security score computing platform 310 in step 35). Such information may, for example, be stored and/or maintained by customer portal computing platform 308 and/or may be used by customer portal computing platform 308 in providing the customer portal user interface (e.g., to the customer via customer computing device 302). For instance, the information about the customer's one or more security preferences that may be gathered by customer portal computing platform 308 in step 36 may include an indication of how strong the customer's password is, an indication of how much time has elapsed since the customer last changed his or her password, an indication of whether the customer has enrolled in a program requiring a one-time passcode when logging into the customer portal user interface provided by customer portal computing platform 308 and/or when responding to one or more challenge questions that may be presented by customer portal computing platform 308, an indication of whether the customer has enrolled in a program in which the customer receives security alerts or other messages about security events affecting his or her account(s), and/or an indication of whether the customer has installed a browser security plug-in on one or more of his or her computing devices. At step 37, customer portal computing platform 308 may provide the gathered information (which may, e.g., include one or more security preferences associated with the customer) to security score computing platform 310.

At step 38, security score computing platform 310 may receive the customer's one or more security preferences from customer portal computing platform 308. For example, in step 38, security score computing platform 310 may receive (e.g., via communication interface 322, from customer portal computing platform 308) the one or more security preferences associated with the customer (which may, e.g., have been gathered by customer portal computing platform 308 in step 36 and sent by customer portal computing platform 308 in step 37). In receiving the one or more security preferences associated with the customer, security score computing platform 310 may, for example, receive information including an indication of how strong the customer's password is (e.g., low complexity, medium complexity, high complexity, and/or the like), an indication of how much time has elapsed since the customer last changed his or her password (e.g., less than 60 days, between 60 days and 90 days, more than 90 days, and/or the like), an indication of whether the customer has enrolled in a program requiring a one-time passcode when logging into a customer portal user interface and/or when responding to one or more challenge questions, an indication of whether the customer has enrolled in a program in which the customer receives security alerts or other messages about security events affecting his or her account(s), and/or an indication of whether the customer has installed a browser security plug-in on one or more of his or her computing devices.

At step 39, security score computing platform 310 may determine a security score for the customer. For example, in step 39, security score computing platform 310 may determine a security score for the customer based on the at least one security score definition file (which may, e.g., have been generated by security score computing platform 310 in step 3 above) and based on the one or more security preferences associated with the customer (which may, e.g., have been received by security score computing platform in step 38 above). As discussed above, the at least one security score definition file may include one or more weighted criteria for different statuses of one or more security parameters that may be evaluated by security score computing platform 310 in view of a particular customer's security preferences. In determining a security score for a particular customer, security score computing platform 310 thus may determine, based on the particular customer's security preferences, the state or status of each security parameter identified in the at least one security score definition file. Then, security score computing platform 310 may determine a parameter score for each security parameter based on the determined state or status of each security parameter and the corresponding weightage specified in the at least one security score definition file. Security score computing platform 310 may then calculate the security score for the customer by summing the parameter scores for each of the security parameters identified in the at least one security score definition file.

At step 40, security score computing platform 310 may provide the security score determined in step 39 to security dashboard computing platform 312. For example, in step 40, security score computing platform 310 may provide (e.g., via communication interface 322, to security dashboard computing platform 312) the determined security score for the customer.

At step 41, security dashboard computing platform 312 may receive the security score for the customer from security score computing platform 310. For example, in step 41, security dashboard computing platform 312 may receive (e.g., via communication interface 332, from security score computing platform 310) the security score for the customer (e.g., as determined by security score computing platform 310 in step 39). In one or more embodiments, the security score for the customer may be determined based on one or more security preferences associated with the customer and one or more weighted criteria for evaluating customer security preferences, as illustrated above. In addition, the one or more weighted criteria may, in some instances, include at least one of: an indication of password strength; an indication of an amount of time elapsed since a password change event; an indication of whether a one-time passcode is required at login; an indication of whether a one-time passcode is required when responding to a challenge question; an indication of whether a customer account is enrolled in a security alert program; and an indication of whether a customer device is loaded with a browser security plug-in, as also illustrated above.

At step 42, security dashboard computing platform 312 may request login history information for the customer from customer portal computing platform 308. Such login history information may, in some instances, be used by security dashboard computing platform 312 in generating a security dashboard user interface, and the login history information may, for instance, be maintained by customer portal computing platform 308. At step 43, customer portal computing platform 308 may gather login history information associated with the customer. Such login history information may, for example, include one or more logs of the date and/or time of successful and/or attempted logins into customer portal computing platform 308 (e.g., using the customer's login credentials), location and network address data associated with successful and/or attempted logins into customer portal computing platform 308, and/or device and mode information (e.g., desktop, mobile, and the like) associated with successful and/or attempted logins into customer portal computing platform 308. At step 44, customer portal computing platform 308 may provide the gathered login history information to security dashboard computing platform 312.

At step 45, security dashboard computing platform 312 may generate a security dashboard user interface for the customer. For example, in step 45, security dashboard computing platform 312 may generate, based on the security score for the customer (e.g., as received in step 41) and/or based on the login history information for the customer (e.g., as received in step 44) and/or based on other information, a security dashboard user interface for the customer. For example, security dashboard computing platform 312 may generate a graphical user interface similar to graphical user interface 600, depicted in FIG. 6.

Figure 6:
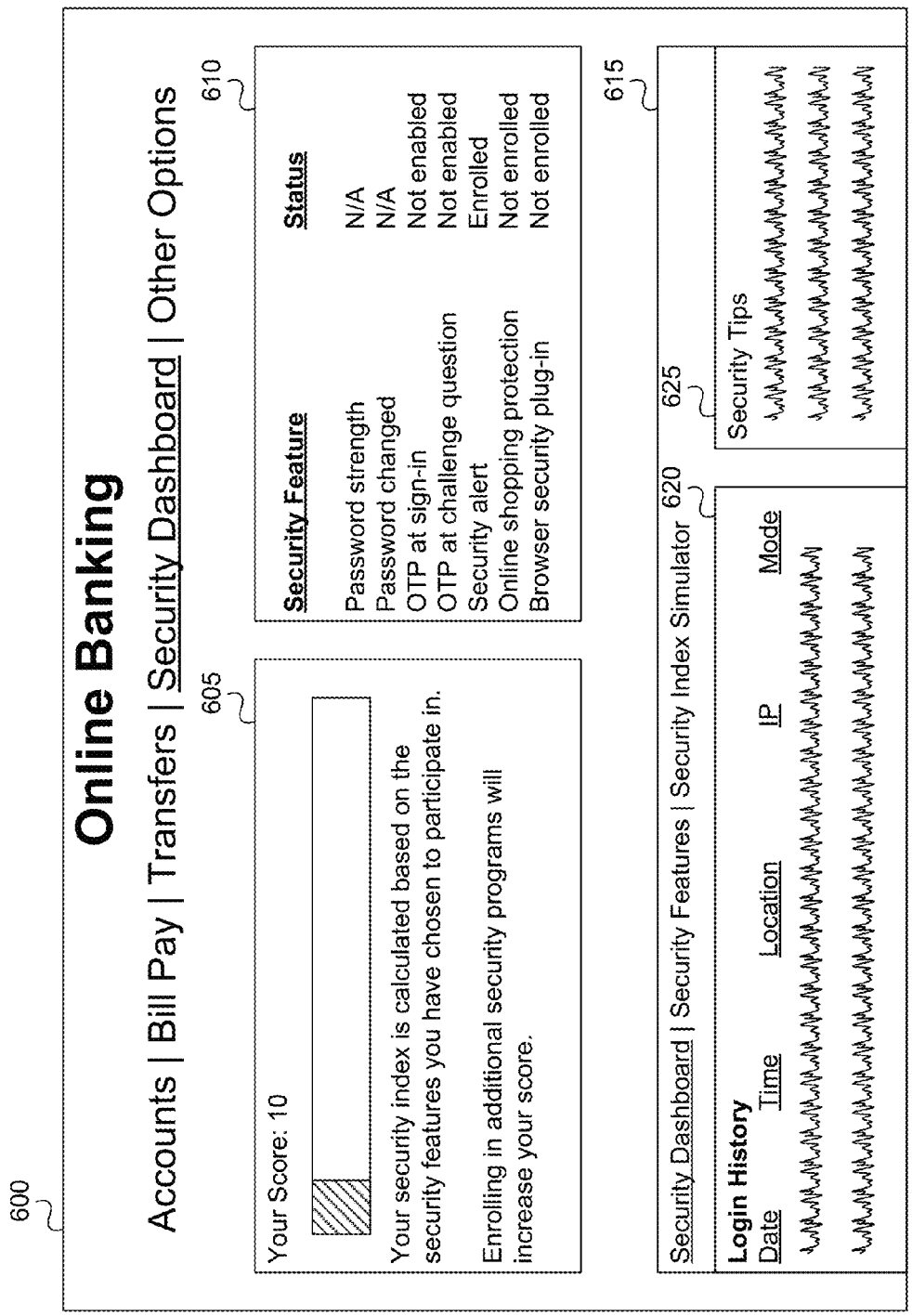
FIG. 6 depicts an example graphical user interface for presenting a security dashboard in accordance with one or more example embodiments.

Referring to FIG. 6, graphical user interface 600 may include one or more elements for presenting and/or displaying information about a customer's security preferences, such as the customer's security score, login history information, and/or other information. For example, graphical user interface 600 may include a region 605 in which the customer's security score may be presented and/or displayed. In addition to including the customer's security score, region 605 may additionally or alternatively include a graph of the customer's security score and/or textual information that may, for instance, explain how the security score is calculated and how the customer can increase his or her security score. Graphical user interface 600 also may include, for example, region 610 in which various criteria used in evaluating the customer's security preferences and/or status indicators associated with the customer's security preferences may be presented and/or displayed. In some arrangements, the status indicators included in region 610 may be color-coded, such that the security dashboard user interface for the customer (e.g., graphical user interface 600) may include at least one region having a color-coded status indicator for each criterion of the one or more weighted criteria for evaluating customer security preferences. In addition, a state of the color-coded status indicator for each criterion of the one or more weighted criteria for evaluating customer security preferences may be determined based on a corresponding security preference of the one or more security preferences associated with the customer. For example, in generating the security dashboard user interface for the customer (e.g., graphical user interface 600), security dashboard computing platform 312 may determine a state of each color-coded status indicator included in region 610 based on the customer's security preferences (which may, e.g., be requested and/or received from customer portal computing platform 308 and/or which may, e.g., provided by security score computing platform 310 along with the customer's security score in step 40 above).

Graphical user interface 600 also may include region 615 in which other customer security information may be presented and/or displayed. In some arrangements, the information included in region 615 may include the customer's login history information, such that the security dashboard user interface for the customer (e.g., graphical user interface 600) may include at least one region having login history information for the customer. Such login history information may, for instance, be displayed in a table, such as table 620, and may include information about the date and/or time of previous login attempts, the location of previous login attempts, the network address associated with previous login attempts, and/or the access mode (e.g., desktop, mobile, and/or the like) associated with previous login attempts. Region 615 also may include an information box 625 in which one or more security tips and/or other information may be presented and/or displayed.

FIG. 7 illustrates another example of a graphical user interface 700 that may be generated by security dashboard computing platform 312 (e.g., when generating a security dashboard user interface, such as in step 45). Referring to FIG. 7, graphical user interface 700 may include one or more elements for presenting and/or displaying information about a customer's security preferences, such as the customer's security score, login history information, and/or other information. For example, graphical user interface 700 may include an alert region 705 in which one or more security alerts and/or other information may be presented and/or displayed. Graphical user interface 700 also may include, for example, a security score region 710, in which the customer's security score, various criteria used in evaluating the customer's security preferences and/or in determining the customer's security score, and/or status indicators associated with the customer's security preferences may be presented and/or displayed. In some arrangements, the status indicators included in security score region 710 may be color-coded, such that the security dashboard user interface for the customer (e.g., graphical user interface 700) may include at least one region having a color-coded status indicator for each criterion of the one or more weighted criteria for evaluating customer security preferences. In addition, a state of the color-coded status indicator for each criterion of the one or more weighted criteria for evaluating customer security preferences may be determined based on a corresponding security preference of the one or more security preferences associated with the customer. For example, in generating the security dashboard user interface for the customer (e.g., graphical user interface 700), security dashboard computing platform 312 may determine a state of each color-coded status indicator included in region 710 based on the customer's security preferences (which may, e.g., be requested and/or received from customer portal computing platform 308 and/or which may, e.g., provided by security score computing platform 310 along with the customer's security score in step 40 above).

Graphical user interface 700 also may include login learning center region 715 in which other customer security information may be presented and/or displayed. In some arrangements, the information included in learning center region 715 may include the customer's login history information, such that the security dashboard user interface for the customer (e.g., graphical user interface 700) may include at least one region having login history information for the customer. Such login history information may, for instance, be displayed in a table and may include information about the date and/or time of previous login attempts, the location of previous login attempts, the network address associated with previous login attempts, and/or the access mode (e.g., desktop, mobile, and/or the like) associated with previous login attempts. Learning center region 715 may also include a "device registration" link that may provide access to one or more web pages and/or other user interfaces that allow a user to register, authorize, and/or otherwise identify one or more specific computing devices for use with a customer portal, such as the customer portal provided by customer portal computing platform 308.

In some instances, the login history information that may be presented and/or displayed in a security dashboard user interface (e.g., in region 615 of user interface 600, in region 715 of user interface 700) may include information about all login attempts regardless of the computing device used in each particular login attempt. An example of a portion of a graphical user interface 800 that includes such login history information is illustrated in FIG. 8. As seen in FIG. 8, such login history information may, for example, be sorted according to a list view, a calendar view, and/or a map view. In other instances, the login history information that may be presented and/or displayed in a security dashboard user interface (e.g., in region 615 of user interface 600, in region 715 of user interface 700) may include device-specific login history information that catalogues all login attempts for one or more specific computing devices. An example of a portion of a graphical user interface 900 that includes such device-specific login history information is illustrated in FIG. 9.

Figure 10:
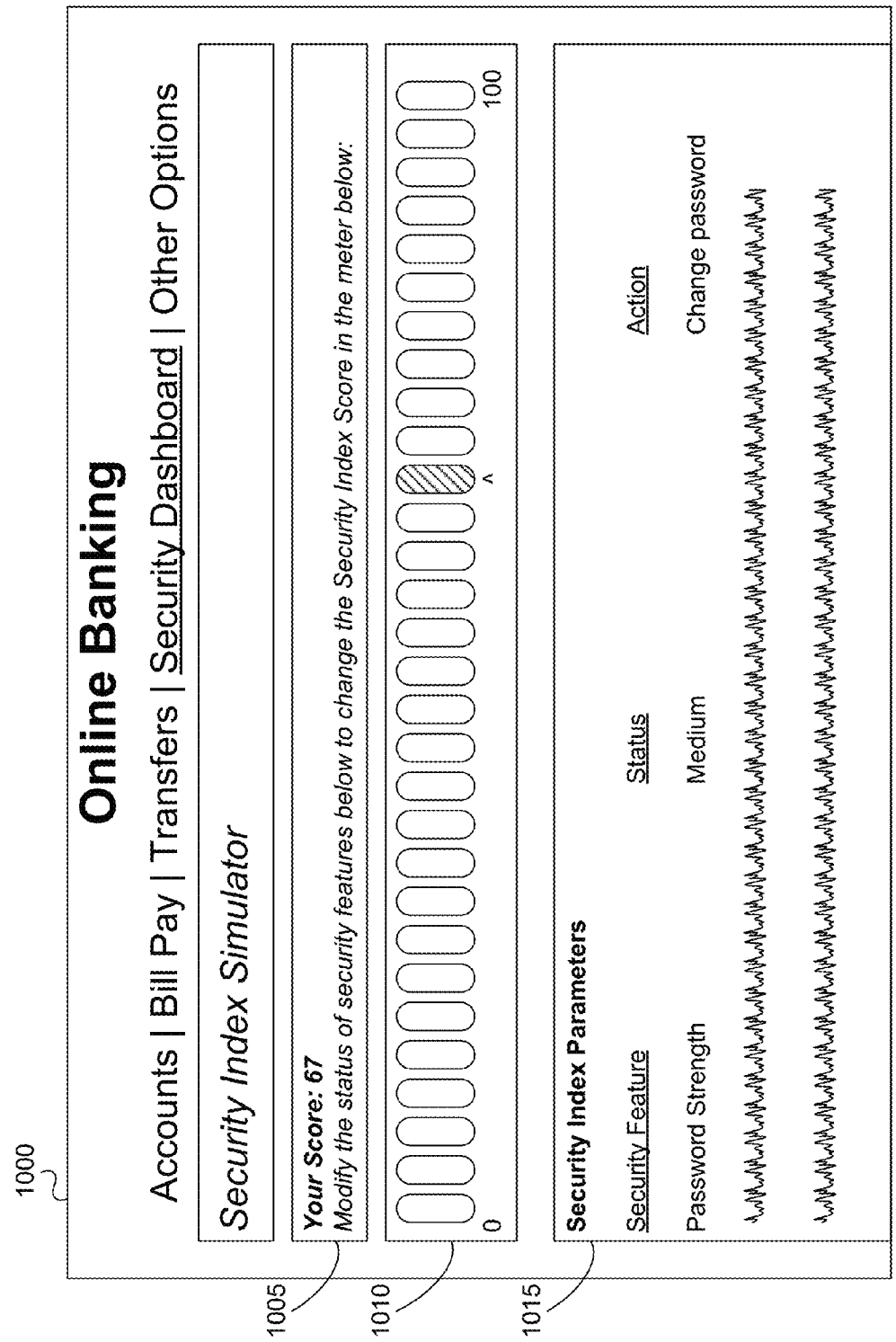
FIG. 10 depicts an example graphical user interface for presenting a security score simulator in accordance with one or more example embodiments.

In some embodiments, the security dashboard user interface for the customer may include at least one region having a security score simulator. An example of a graphical user interface 1000 that includes such a security score simulator is illustrated in FIG. 10. As seen in FIG. 10, graphical user interface 1000 may include a security score region 1005 in which the customer's security score and/or other information may be presented and/or displayed. Graphical user interface 1000 also may include a dynamic score indicator region 1010 and a dynamic security parameter region 1015 that together may form a security score simulator. For example, dynamic score indicator region 1010 may include one or more color-coded status indicators that may dynamically update to reflect a customer's security score as a user makes changes to one or more security preferences included in dynamic security parameter region 1015 and/or otherwise interacts with dynamic security parameter region 1015.

In particular, dynamic security parameter region 1015 may include information about the customer's security preferences (which may, e.g., correspond to each criterion of the one or more weighted criteria for evaluating customer security preferences), such as a current status and/or state of each security preference, and/or one or more action indicators (which may, e.g., be user-selectable links that enable the user to edit and/or otherwise modify corresponding security preferences). For example, dynamic security parameter region 1015 may include information about the customer's password strength, as well as a status indicator showing that the customer's password is currently considered of "medium" strength, and may further include an action indicator that is a user-selectable link that enables the user to change his or her password. In addition, as and/or after a user interacts with the one or more action indicators (e.g., after the user changes his or her password in the previous example), the status indicator(s) included in the dynamic security parameter region 1015 may be updated (e.g., to show that the user's password is now considered to be "high" strength instead of "medium" strength) and the customer's security score itself may be updated in security score region 1005 and/or the dynamic score indicator region 1010 may be updated to reflect the updated, and potentially higher, security score for the customer.

In this way, the security score simulator included in the security dashboard user interface (e.g., graphical user interface 1000) may be configured to receive user input adjusting at least one security preference of one or more security preferences associated with the customer, determine a revised security score for the customer based on the received user input, and update information included in the security dashboard user interface for the customer based on the revised security score for the customer. For example, the security score simulator included in graphical user interface 1000 may be configured to receive and/or cause a computing device presenting and/or displaying the user interface 1000 to receive user input adjusting at least one security preference included in dynamic security parameter region 1015. The security score simulator may be further configured to determine and/or cause a computing device presenting and/or displaying the user interface 1000 to determine a revised security score for the customer based on the user input adjusting at least one security preference included in dynamic security parameter region 1015. And the security score simulator may be further configured to update and/or cause a computing device presenting and/or displaying the user interface 1000 to update information including in security score region 1005 and/or dynamic score indicator region 1010 based on the revised security score for the customer.

Referring again to FIG. 4J, at step 46, security dashboard computing platform 312 may provide the security dashboard user interface (e.g., as generated in step 45) to customer portal computing platform 308. For example, in step 46, security dashboard computing platform 312 may provide (e.g., via communication interface 332, to customer portal computing platform 308) the generated security dashboard user interface for the customer.

At step 47, customer portal computing platform 308 may send the security dashboard user interface for the customer to customer computing device 302. At step 48, customer computing device 302 may present the security dashboard user interface (e.g., as received from customer portal computing platform 308 in step 47). In presenting the security dashboard user interface, customer computing device 302 may display the security dashboard user interface, receive user input interacting with one or more elements of the security dashboard user interface, and respond to such user input. In addition, the security dashboard user interface presented by customer computing device 302 in step 48 may, for example, incorporate one or more aspects of the example graphical user interfaces discussed above and illustrated in FIGS. 6-10.

FIGS. 5A-5G depict another illustrative event sequence for evaluating customer security preferences in accordance with one or more example embodiments. In the discussion that follows, the events illustrated in FIGS. 5A-5G will be discussed as occurring after the events illustrated in FIGS. 4A-4J. However, one or more events illustrated in FIGS. 5A-5G may, in some instances, precede one or more of the events illustrated in FIGS. 4A-4J. Additionally or alternatively, one or more events may occur at substantially the same time (e.g., as customer portal computing platform 308 receives and responds to requests from both customer computing device 302 and customer mobile device 306).

Figure 5A:
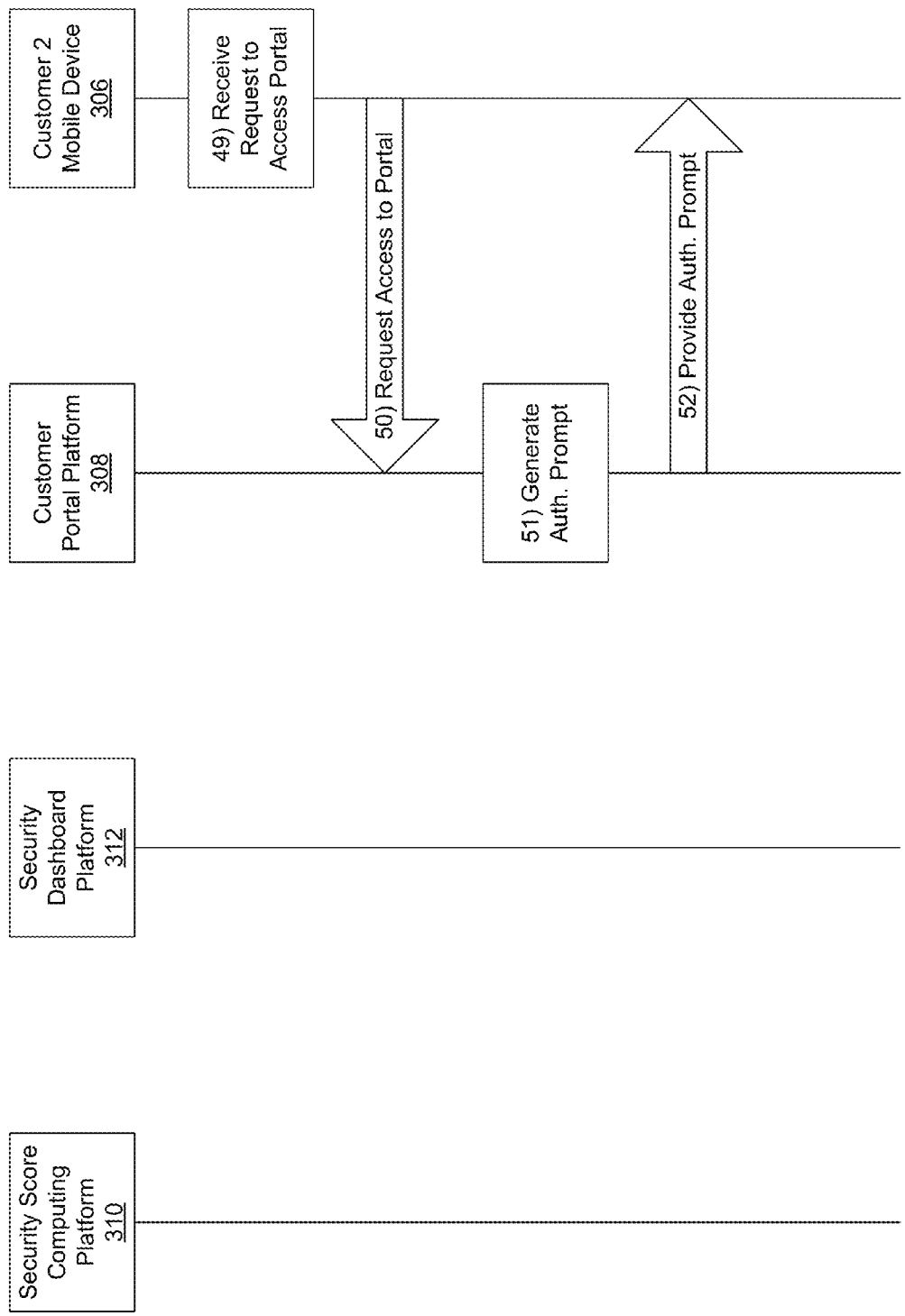
FIGS. 5A-5G depict another illustrative event sequence for evaluating customer security preferences in accordance with one or more example embodiments.
Figure 5B:
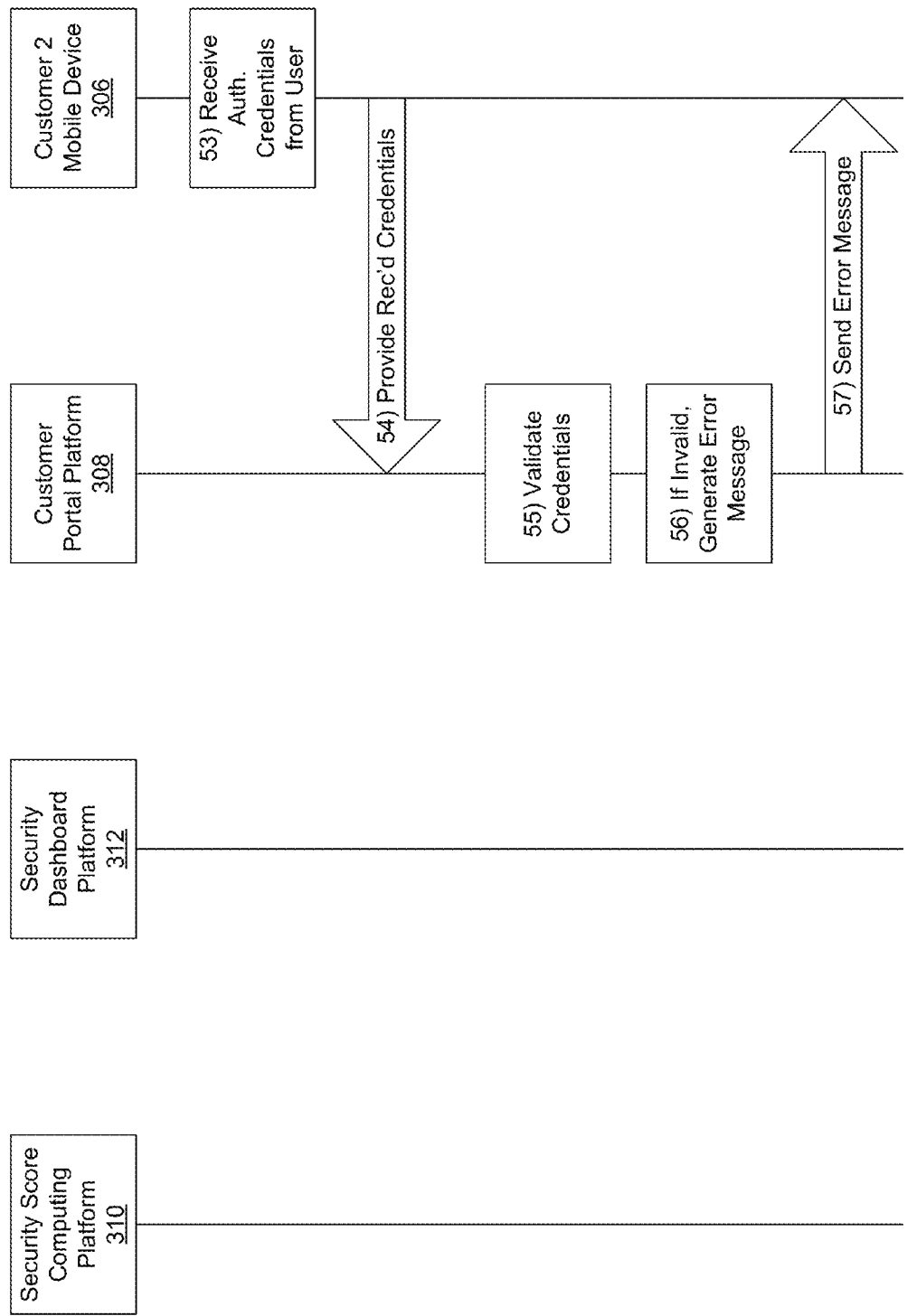
Figure 5C:
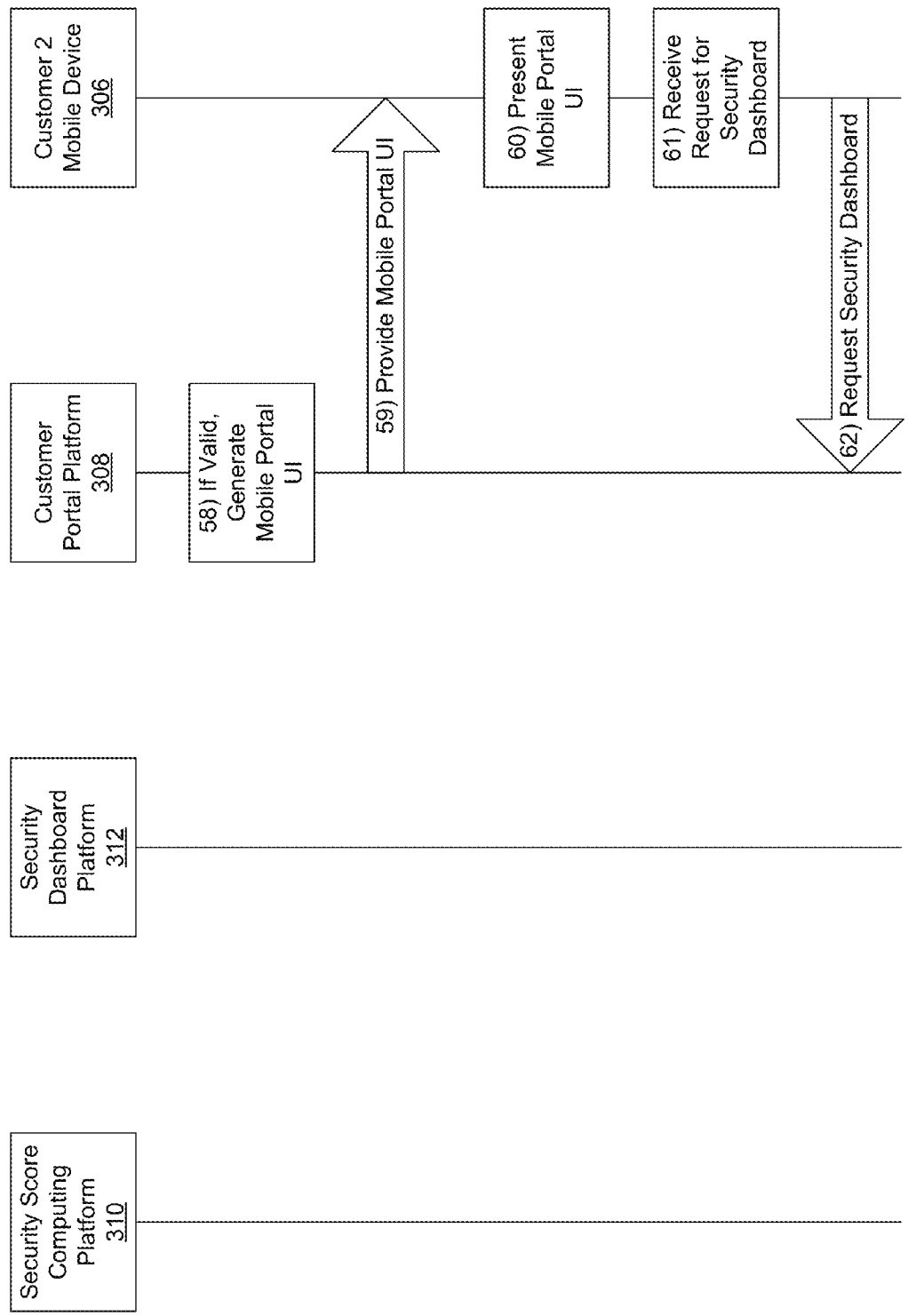
Figure 5D:
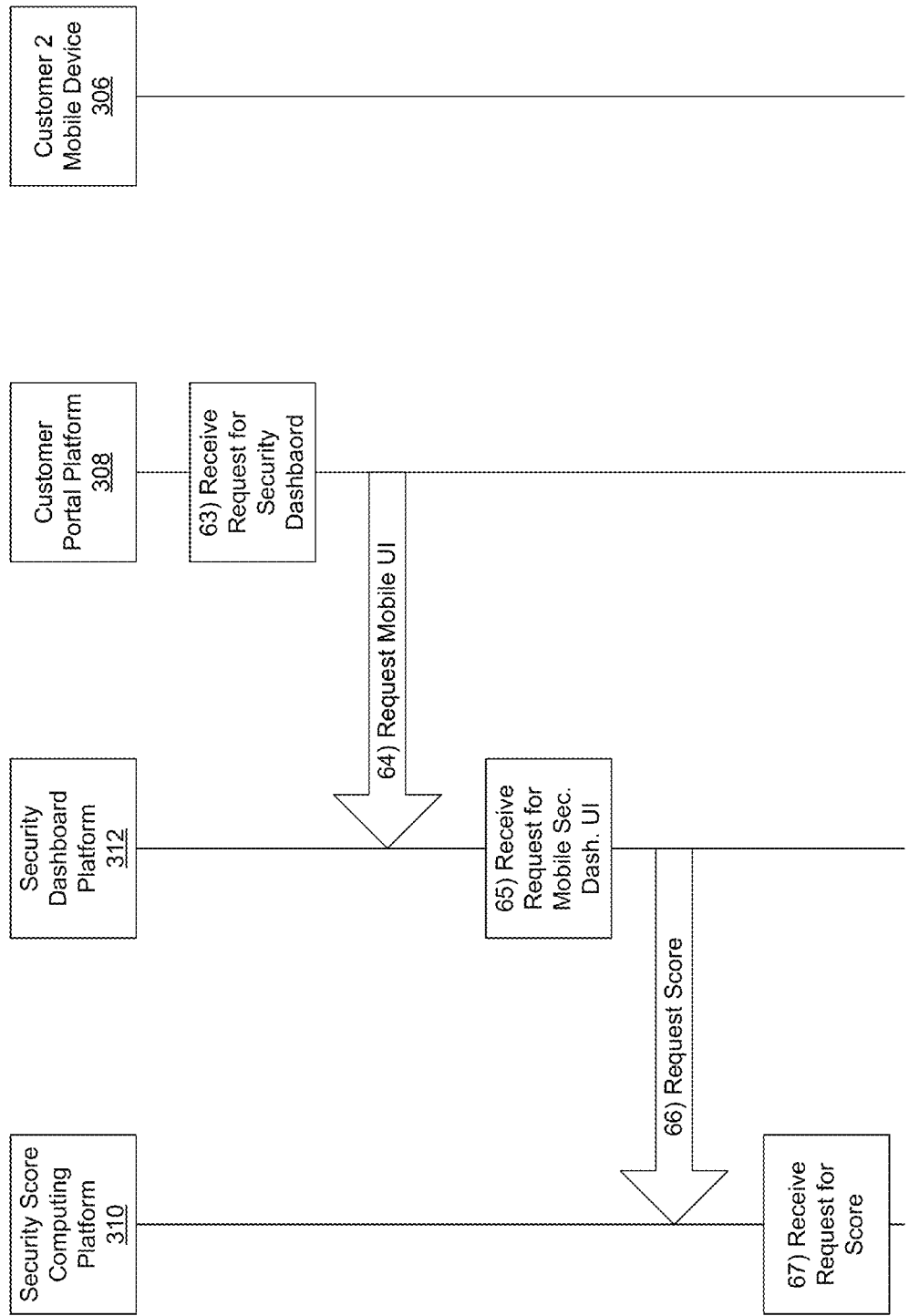
Figure 5E:
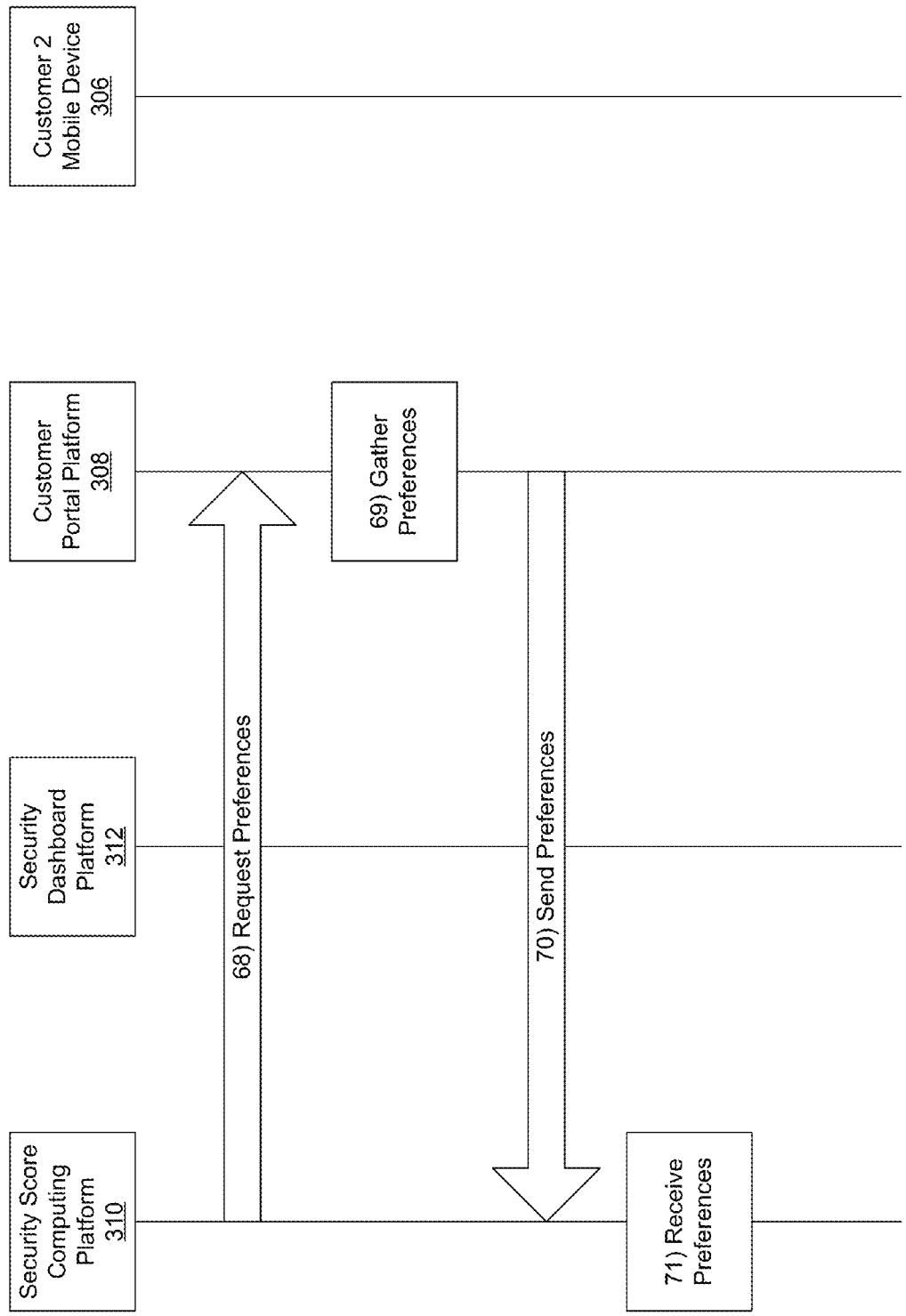
Figure 5F:
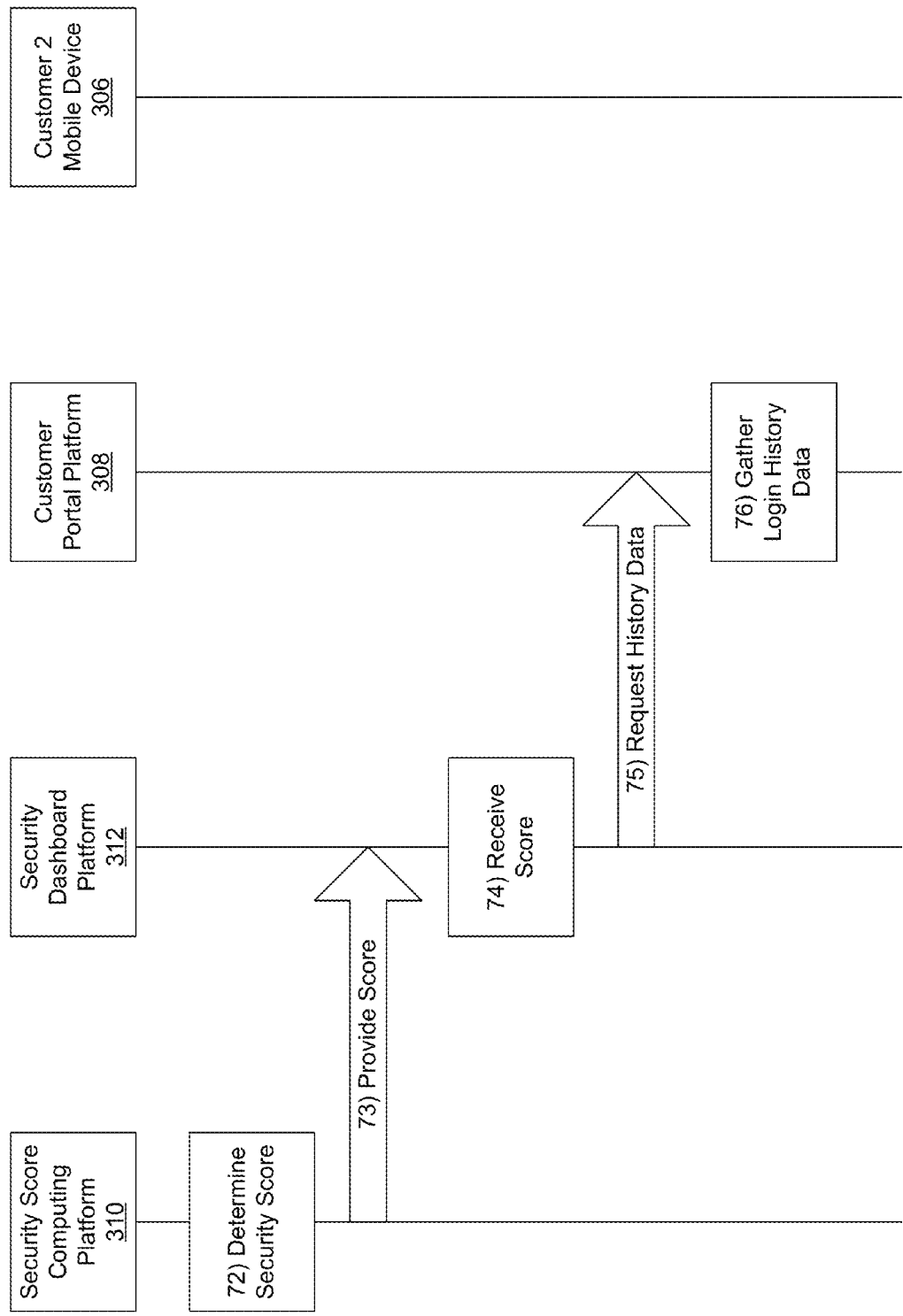
Figure 5G:
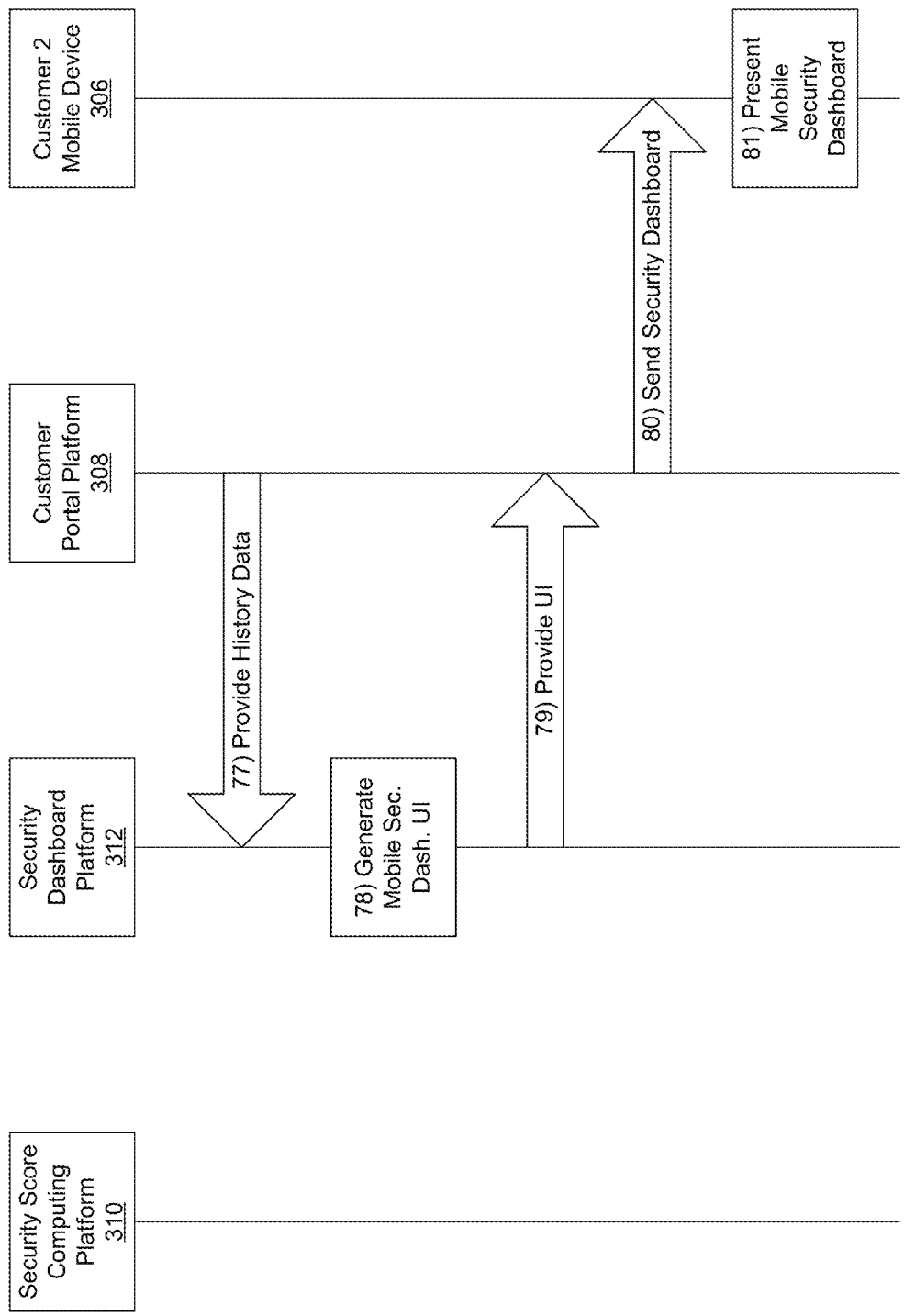

Referring to FIG. 5A, at step 49, customer mobile device 306 may receive a request to access a customer portal. The request to access the customer portal may, for example, be received from a user of customer mobile device 306, and the customer portal may include the same website and/or other customer portal features discussed above.

At step 50, customer mobile device 306 may send a request to access the customer portal to customer portal computing platform 308. In response to receiving the request to access the customer portal, customer portal computing platform 308 may generate an authentication prompt at step 51. At step 52, customer portal computing platform 308 may provide the authentication prompt to customer mobile device 306 (e.g., to facilitate authentication of the user of customer mobile device 306).

At step 53, customer mobile device 306 may receive one or more authentication credentials from a user of customer mobile device 306. For example, in step 53, customer mobile device 306 may receive and present the authentication prompt provided by customer portal computing platform 308, and the one or more authentication credentials may be received by customer mobile device 306 from the user of customer mobile device 306 in response to presenting the authentication prompt. At step 54, customer mobile device 306 may provide the received authentication credentials to customer portal computing platform 308.

At step 55, customer portal computing platform 308 may validate the authentication credentials received from customer mobile device 306. In validating the received authentication credentials, customer portal computing platform 308 may compare the received authentication credentials with one or more valid sets of credentials to identify and authenticate the user of customer mobile device 306. If customer portal computing platform 308 determines that the received authentication credentials are invalid (e.g., in step 55), then at step 56, customer portal computing platform 308 may generate an error message, and at step 57, customer portal computing platform 308 may send the generated error message to customer mobile device 306.

Alternatively, if customer portal computing platform 308 determines that the received authentication credentials are valid (e.g., in step 55), then at step 58, customer portal computing platform may generate a mobile customer portal user interface. The mobile customer portal user interface may, for example, include one or more webpages and/or other user interfaces that may enable a user of customer mobile device 306 to access, view, and/or edit various types of information. In one or more arrangements, the mobile customer portal user interface may include one or more online banking user interfaces that may enable a user of customer mobile device 306 to access, view, and/or manage one or more financial accounts that may be maintained by a financial institution. For example, the mobile customer portal user interface may include one or more online banking user interfaces that enable the user of customer mobile device 306 to view account balances, transfer funds between accounts, pay bills, conduct other transactions, and/or otherwise view and/or manage one or more accounts that may be maintained by the financial institution. Additionally or alternatively, the mobile customer portal user interface may be optimized for display on a mobile device (e.g., the user interface may be optimized for display on a relatively small screen, may be configured to respond to touch-based user input and/or gestures, such as taps and/or swipes, and/or may be otherwise optimized for use with a mobile device). In instances in which the mobile customer portal user interface provides online banking functionalities, the mobile customer portal user interface may thus provide a mobile banking user interface.

At step 59, customer portal computing platform 308 may provide the mobile customer portal user interface to customer mobile device 306. In providing the mobile customer portal user interface to customer mobile device 306, customer portal computing platform 308 may, for example, serve one or more static and/or dynamic web pages to customer mobile device 306. At step 60, customer mobile device 306 may present the mobile customer portal user interface received from customer portal computing platform 308. In presenting the mobile customer portal user interface, customer mobile device 306 may, for example, display the mobile customer portal user interface (e.g., on a touch-sensitive display screen included in and/or coupled to customer mobile device 306) and/or cause the user interface to be displayed (e.g., in a web browser and/or using other software on the customer mobile device 306).

At step 61, customer mobile device 306 may receive a request to access a security dashboard. Such a request may, for example, be received by customer mobile device 306 as user input that includes a selection of a link, button, or other control included in the mobile customer portal user interface. At step 62, after receiving the request to access the security dashboard, customer mobile device 306 may request a security dashboard from customer portal computing platform 308.

At step 63, customer portal computing platform 308 may receive the request for a security dashboard from customer mobile device 306. After receiving the request for the security dashboard from customer mobile device 306, customer portal computing platform 308 may determine to request a mobile security dashboard user interface for customer mobile device 306 (e.g., based on previously identifying customer mobile device 306 as a mobile device and providing customer mobile device 306 with the mobile customer portal user interface, and instead of determining to request a non-mobile security dashboard user interface for customer mobile device 306 that might, e.g., be more preferably displayed on a desktop computer or laptop computer instead of a mobile device). At step 64, customer portal computing platform 308 may request a mobile security dashboard user interface from security dashboard computing platform 312. In requesting the mobile security dashboard user interface from security dashboard computing platform 312, customer portal computing platform 308 may provide information identifying the customer using customer mobile device 306 (which may, e.g., have been determined and/or stored by customer portal computing platform 308 during the identification and/or authentication of the user of customer mobile device 306 discussed above) to security dashboard computing platform 312. The information identifying the customer using customer mobile device 306 may, for example, be used by security dashboard computing platform 312 in generating a mobile security dashboard user interface for the customer that includes customer-specific information, such as account information that is specific to the customer.

At step 65, security dashboard computing platform 312 may receive the request for a mobile security dashboard user interface from customer portal computing platform 308. For example, in step 65, security dashboard computing platform 312 may receive (e.g., via communication interface 332, from customer portal computing platform 308) a request for a mobile security dashboard user interface for a customer. The request for the security dashboard user interface may, for example, include information identifying the customer for which the mobile security dashboard user interface is to be generated, and such information may include information identifying the customer using customer mobile device 306 (e.g., the second customer who may be the user of customer mobile device 306).

At step 66, security dashboard computing platform 312 may request a security score from security score computing platform 310. For example, in response to receiving the request for the mobile security dashboard interface for a customer (e.g., in step 65), security dashboard computing platform 312 may, in step 66, request (e.g., via communication interface 332, from security score computing platform 310) a security score for the second customer. In requesting the security score for the second customer, security dashboard computing platform 312 may embed in the request and/or otherwise send to security score computing platform 310 information identifying the customer for which the security score is being requested (e.g., the second customer who may be the user of customer mobile device 306), such as a username, one or more account numbers, and/or one or more other identifiers associated with the second customer.

At step 67, security score computing platform 310 may receive the request for a security score for the second customer from security dashboard computing platform 312. For example, in step 67, security score computing platform 310 may receive (e.g., via communication interface 322, from security dashboard computing platform 312) a request for a security score associated with the second customer. The request for the security score may, for example, include information identifying the customer for which the security score is being requested (e.g., the second customer who may be the user of customer mobile device 306), such as a username, one or more account numbers, and/or one or more other identifiers associated with the second customer.

At step 68, security score computing platform 310 may request information about the second customer's security preferences from customer portal computing platform 308. For example, in response to receiving the request for the security score associated with the second customer (e.g., in step 67), security score computing platform 310 may request (e.g., via communication interface 322, from customer portal computing platform 308) one or more security preferences associated with the second customer. The one or more security preferences requested by security score computing platform 310 from customer portal computing platform 308 may, for example, correspond to the one or more weighted criteria for evaluating customer security preferences specified in the at least one security score definition file (which, e.g., may have been generated by security score computing platform 310 in step 3 above).

At step 69, customer portal computing platform 308 may gather information about one or more security preferences for the second customer (e.g., based on the request received from security score computing platform 310 in step 68). Such information may, for example, be stored and/or maintained by customer portal computing platform 308 and/or may be used by customer portal computing platform 308 in providing the customer portal user interface (e.g., to the second customer via customer mobile device 306). For instance, the information about the second customer's one or more security preferences that may be gathered by customer portal computing platform 308 in step 69 may include an indication of how strong the second customer's password is, an indication of how much time has elapsed since the second customer last changed his or her password, an indication of whether the second customer has enrolled in a program requiring a one-time passcode when logging into the customer portal user interface and/or the mobile customer portal user interface provided by customer portal computing platform 308 and/or when responding to one or more challenge questions that may be presented by customer portal computing platform 308, an indication of whether the second customer has enrolled in a program in which the second customer receives security alerts or other messages about security events affecting his or her account(s), and/or an indication of whether the second customer has installed a browser security plug-in on one or more of his or her computing devices. At step 70, customer portal computing platform 308 may provide the gathered information (which may, e.g., include one or more security preferences associated with the second customer) to security score computing platform 310.

At step 71, security score computing platform 310 may receive the second customer's one or more security preferences from customer portal computing platform 308. For example, in step 71, security score computing platform 310 may receive (e.g., via communication interface 322, from customer portal computing platform 308) the one or more security preferences associated with the second customer (which may, e.g., have been gathered by customer portal computing platform 308 in step 69 and sent by customer portal computing platform 308 in step 70). In receiving the one or more security preferences associated with the second customer, security score computing platform 310 may, for example, receive information including an indication of how strong the second customer's password is (e.g., low complexity, medium complexity, high complexity, and/or the like), an indication of how much time has elapsed since the second customer last changed his or her password (e.g., less than 60 days, between 60 days and 90 days, more than 90 days, and/or the like), an indication of whether the second customer has enrolled in a program requiring a one-time passcode when logging into a customer portal user interface and/or a mobile customer portal user interface and/or when responding to one or more challenge questions, an indication of whether the second customer has enrolled in a program in which the second customer receives security alerts or other messages about security events affecting his or her account(s), and/or an indication of whether the second customer has installed a browser security plug-in on one or more of his or her computing devices.

At step 72, security score computing platform 310 may determine a security score for the second customer. For example, in step 72, security score computing platform 310 may determine a security score for the second customer based on the at least one security score definition file (which may, e.g., have been generated by security score computing platform 310 in step 3 above) and based on the one or more security preferences associated with the second customer (which may, e.g., have been received by security score computing platform in step 71 above). As discussed above, the at least one security score definition file may include one or more weighted criteria for different statuses of one or more security parameters that may be evaluated by security score computing platform 310 in view of a particular customer's security preferences. In determining a security score for the second customer, for example, security score computing platform 310 thus may determine, based on the second customer's security preferences, the state or status of each security parameter identified in the at least one security score definition file. Then, security score computing platform 310 may determine a parameter score for each security parameter based on the determined state or status of each security parameter and the corresponding weightage specified in the at least one security score definition file. Security score computing platform 310 may then calculate the security score for the second customer by summing the parameter scores for each of the security parameters identified in the at least one security score definition file.

At step 73, security score computing platform 310 may provide the security score determined in step 72 to security dashboard computing platform 312. For example, in step 73, security score computing platform 310 may provide (e.g., via communication interface 322, to security dashboard computing platform 312) the determined security score for the second customer.

At step 74, security dashboard computing platform 312 may receive the security score for the second customer from security score computing platform 310. For example, in step 74, security dashboard computing platform 312 may receive (e.g., via communication interface 332, from security score computing platform 310) the security score for the second customer (e.g., as determined by security score computing platform 310 in step 72). In one or more embodiments, the security score for the second customer may be determined based on one or more security preferences associated with the second customer and one or more weighted criteria for evaluating customer security preferences, as illustrated above. In addition, the one or more weighted criteria may, in some instances, include at least one of: an indication of password strength; an indication of an amount of time elapsed since a password change event; an indication of whether a one-time passcode is required at login; an indication of whether a one-time passcode is required when responding to a challenge question; an indication of whether a customer account is enrolled in a security alert program; and an indication of whether a customer device is loaded with a browser security plug-in, as also illustrated above.

At step 75, security dashboard computing platform 312 may request login history information for the second customer from customer portal computing platform 308. Such login history information may, in some instances, be used by security dashboard computing platform 312 in generating a mobile security dashboard user interface, and the login history information may, for instance, be maintained by customer portal computing platform 308. At step 76, customer portal computing platform 308 may gather login history information associated with the second customer. Such login history information may, for example, include one or more logs of the date and/or time of successful and/or attempted logins into customer portal computing platform 308 (e.g., using login credentials associated with the second customer), location and network address data associated with successful and/or attempted logins into customer portal computing platform 308, and/or device and mode information (e.g., desktop, mobile, and the like) associated with successful and/or attempted logins into customer portal computing platform 308. At step 77, customer portal computing platform 308 may provide the gathered login history information to security dashboard computing platform 312.

At step 78, security dashboard computing platform 312 may generate a mobile security dashboard user interface for the second customer. For example, in step 78, security dashboard computing platform 312 may generate, based on the security score for the second customer (e.g., as received in step 74) and/or based on the login history information for the second customer (e.g., as received in step 77) and/or based on other information, a mobile security dashboard user interface for the second customer. The mobile security dashboard user interface generated by security dashboard computing platform 312 may, in some arrangements, be a graphical user interface similar to graphical user interface 600, depicted in FIG. 6, and/or graphical user interface 700, depicted in FIG. 7. Additionally or alternatively, the mobile security dashboard user interface may be optimized for display on a mobile device (e.g., the user interface may be optimized for display on a relatively small screen, may be configured to respond to touch-based user input and/or gestures, such as taps and/or swipes, and/or may be otherwise optimized for use with a mobile device).

At step 79, security dashboard computing platform 312 may provide the mobile security dashboard user interface (e.g., as generated in step 78) to customer portal computing platform 308. For example, in step 79, security dashboard computing platform 312 may provide (e.g., via communication interface 332, to customer portal computing platform 308) the generated mobile security dashboard user interface for the second customer.

At step 80, customer portal computing platform 308 may send the mobile security dashboard user interface for the second customer to customer mobile device 306. At step 81, customer mobile device 306 may present the mobile security dashboard user interface (e.g., as received from customer portal computing platform 308 in step 80). In presenting the mobile security dashboard user interface, customer mobile device 306 may display the mobile security dashboard user interface, receive user input interacting with one or more elements of the mobile security dashboard user interface, and respond to such user input. In addition, the mobile security dashboard user interface presented by customer mobile device 306 in step 81 may, for example, incorporate one or more aspects of the example graphical user interfaces discussed above and illustrated in FIGS. 6-10. Additionally or alternatively, the mobile security dashboard user interface presented by customer mobile device 306 in step 81 may be optimized for display on a mobile device (e.g., the user interface may be optimized for display on a relatively small screen, may be configured to respond to touch-based user input and/or gestures, such as taps and/or swipes, and/or may be otherwise optimized for use with a mobile device).

Figure 11:
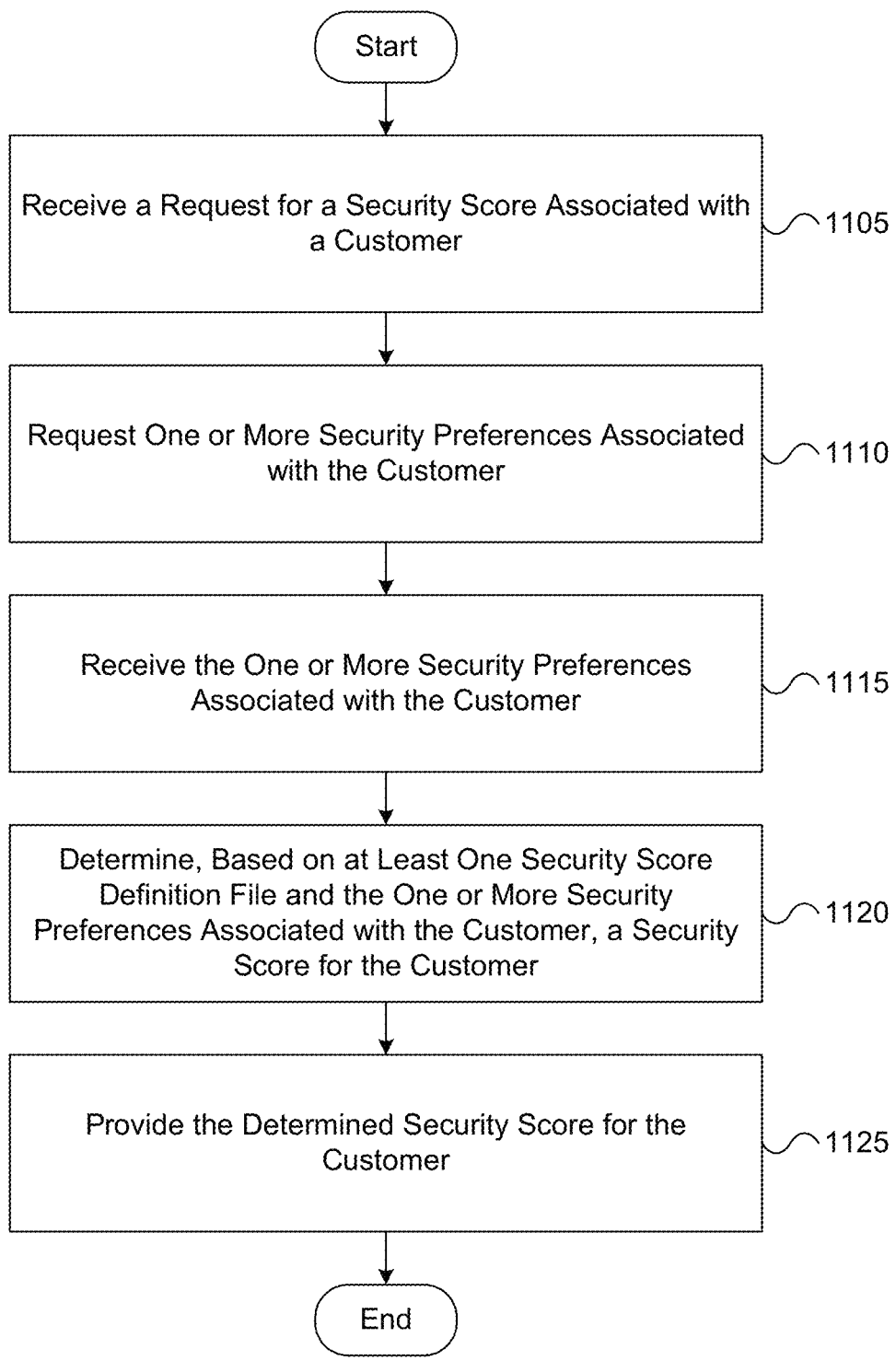
FIG. 11 depicts an illustrative method for evaluating customer security preferences in accordance with one or more example embodiments.

FIG. 11 depicts an illustrative method for evaluating customer security preferences in accordance with one or more example embodiments. Referring to FIG. 11, in step 1105, a request for a security score associated with a customer may be received by a computing platform. For example, in step 1105, security score computing platform 310 may receive a request for a security score associated with a customer from security dashboard computing platform 312. In step 1110, one or more security preferences associated with the customer may be requested. For example, in step 1110, in response to receiving the request for the security score associated with the customer, security score computing platform 310 may request one or more security preferences associated with the customer from customer portal computing platform 308. In step 1115, the one or more security preferences associated with the customer may be received. For example, in step 1115, security score computing platform 310 may receive the one or more security preferences associated with the customer from customer portal computing platform 308. In step 1120, a security score for the customer may be determined based on at least one security score definition file and based on the one or more security preferences associated with the customer. For example, in step 1120, security score computing platform 310 may determine, based on at least one security score definition file and based on the one or more security preferences associated with the customer, a security score for the customer. In step 1125, the determined security score for the customer may be provided. For example, in step 1125, security score computing platform 310 may provide the determined security score for the customer to security dashboard computing platform 312.

Figure 12:
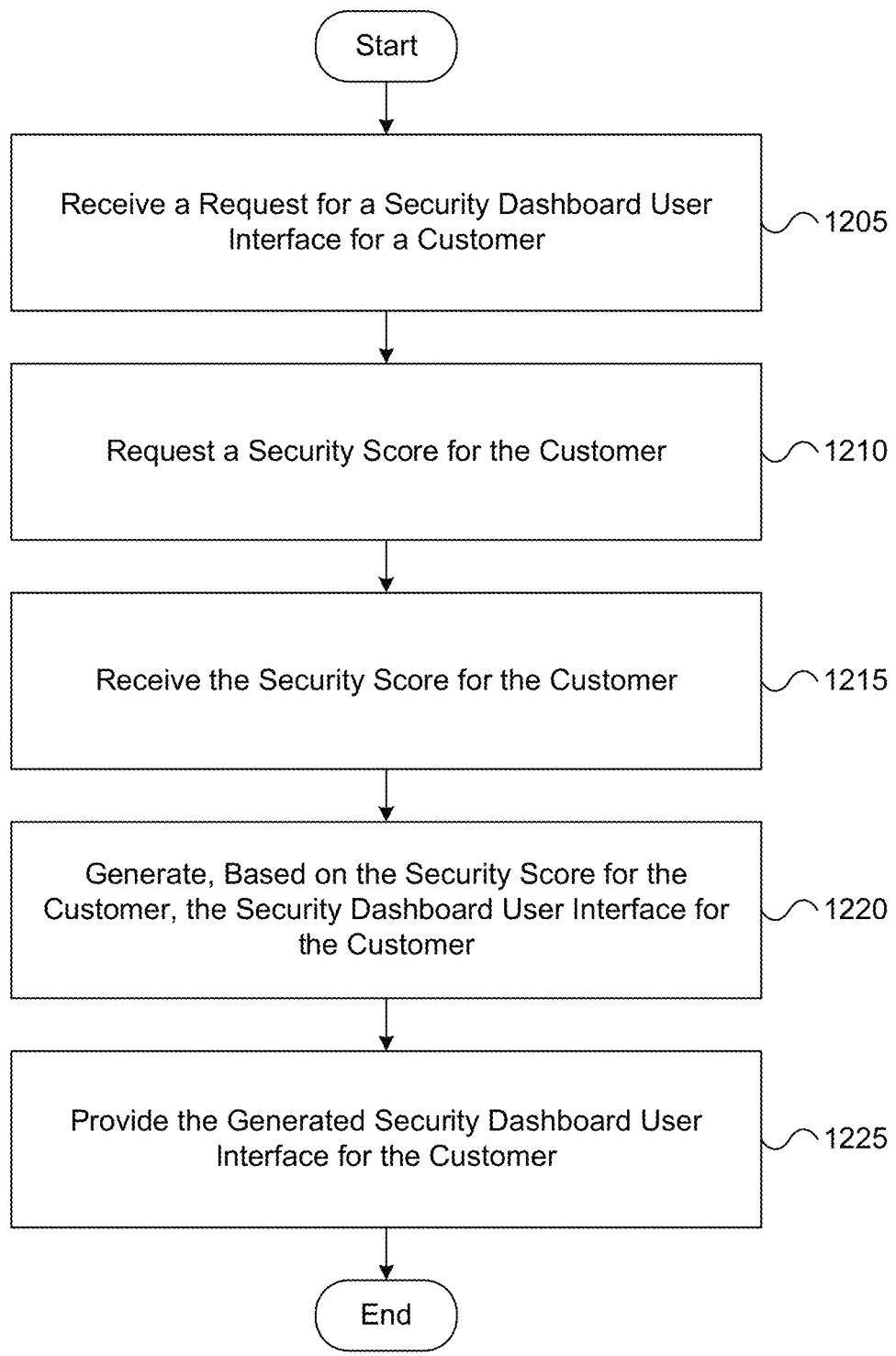
FIG. 12 depicts another illustrative method for evaluating customer security preferences in accordance with one or more example embodiments.

FIG. 12 depicts another illustrative method for evaluating customer security preferences in accordance with one or more example embodiments. Referring to FIG. 12, in step 1205, a request for a security dashboard user interface for a customer may be received by a computing platform. For example, in step 1205, security dashboard computing platform 312 may receive a request for a security dashboard user interface for a customer from customer portal computing platform 308. In step 1210, a security score for the customer may be requested. For example, in step 1210, in response to receiving the request for the security dashboard user interface, security dashboard computing platform 312 may request a security score for the customer from security score computing platform 310. In step 1215, the security score for the customer may be received. For example, in step 1215, security dashboard computing platform 312 may receive the security score for the customer from security score computing platform 310. In step 1220, the security dashboard user interface for the customer may be generated based on the security score for the customer. For example, in step 1220, security dashboard computing platform 312 may generate the security dashboard user interface for the customer based on the security score for the customer. In step 1225, the generated security dashboard user interface for the customer may be provided. For example, in step 1225, security dashboard computing platform 312 may provide the generated security dashboard user interface for the customer to customer portal computing platform 308.

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular tasks or implement particular abstract data types when executed by one or more processors in a computer or other data processing device. The computer-executable instructions may be stored on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, application-specific integrated circuits (ASICs), field programmable gate arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may comprise one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative embodiments, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, and one or more depicted steps may be optional in accordance with aspects of the disclosure.

What is claimed is:

1. A method, comprising:
    at a security score computing platform comprising at least one processor, a memory, and a communication interface:
        receiving, by the at least one processor via the communication interface, from an administrative computing device, one or more security parameters for evaluating customer security preferences;
        generating, by the at least one processor, based on the one or more security parameters for evaluating customer security preferences, at least one security score definition file;
        receiving, by the at least one processor via the communication interface, from a security dashboard computing platform, a request for a security score associated with a customer of a financial institution, the customer of the financial institution having a user account for accessing an online banking interface associated with the financial institution;
        in response to receiving the request for the security score associated with the customer of the financial institution, requesting, by the at least one processor via the communication interface, from a customer portal computing platform configured to provide the online banking interface associated with the financial institution, one or more security preferences associated with the customer of the financial institution;
        receiving, by the at least one processor via the communication interface, from the customer portal computing platform, the one or more security preferences associated with the customer of the financial institution;
        determining, by the at least one processor, based on the at least one security score definition file and based on the one or more security preferences associated with the customer of the financial institution, a security score for the customer of the financial institution; and
        providing, by the at least one processor via the communication interface, to the security dashboard computing platform, the determined security score for the customer of the financial institution, wherein the security dashboard computing platform is configured to generate a security dashboard user interface for the customer of the financial institution based on the determined security score for the customer of the financial institution,
        wherein the at least one security score definition file specifies one or more weighted criteria for evaluating customer security preferences,
        wherein the one or more weighted criteria comprises an indication of an amount of time elapsed since a password change event associated with the user account of the customer of the financial institution, an indication of whether a one-time passcode is required at login for the user account of the customer of the financial institution, and an indication of whether a one-time passcode is required when responding to a challenge question for the user account of the customer of the financial institution, and
        wherein the at least one security score definition file identifies one or more actions, and the security score computing platform is configured to perform at least one action of the one or more actions identified by the at least one security score definition file based on a state of at least one security parameter of the one or more security parameters.

2. The method of claim 1, wherein the one or more weighted criteria comprises:
    an indication of password strength for the user account of the customer of the financial institution;
    an indication of whether the user account of the customer of the financial institution is enrolled in a security alert program; and
    an indication of whether a customer device associated with the customer of the financial institution is loaded with a browser security plug-in.

3. The method of claim 1, comprising:
    receiving, by the at least one processor via the communication interface, from the administrative computing device, one or more batch processing instructions for evaluating customer security preferences for a group of customers of the financial institution;
    based on the one or more batch processing instructions, requesting, by the at least one processor via the communication interface, from the customer portal computing platform, one or more security preferences associated with the group of customers of the financial institution;
    receiving, by the at least one processor via the communication interface, from the customer portal computing platform, the one or more security preferences associated with the group of customers of the financial institution;
    based on the one or more batch processing instructions, determining, by the at least one processor, based on the at least one security score definition file and based on the one or more security preferences associated with the group of customers of the financial institution, at least one security score for each customer included in the group of customers of the financial institution; and
    storing, by the at least one processor, the at least one security score for each customer included in the group of customers of the financial institution.

4. The method of claim 3, wherein the one or more batch processing instructions include a schedule for evaluating customer security preferences for at least one customer included in the group of customers of the financial institution.

5. The method of claim 3, wherein the one or more batch processing instructions include a schedule for determining an updated customer security score for at least one customer included in the group of customers of the financial institution.

6. The method of claim 1, wherein the one or more security preferences associated with the customer of the financial institution comprises a password associated with the customer of the financial institution and one or more one-time passcode preferences associated with the customer of the financial institution.

7. The method of claim 6, wherein the one or more security preferences associated with the customer of the financial institution comprises one or more security alert preferences associated with the customer of the financial institution and one or more browser security preferences associated with the customer of the financial institution.

8. The method of claim 6, wherein the online banking interface associated with the financial institution comprises one or more user interfaces that enable the customer of the financial institution to view account balance information associated with one or more financial accounts maintained by the financial institution, transfer funds between one or more accounts, and pay one or more bills.

9. The method of claim 1, wherein the at least one action comprises providing a link to change a password associated with the user account of the customer of the financial institution.

10. The method of claim 1, wherein the at least one action comprises providing a link to change one-time passcode preferences associated with the user account of the customer of the financial institution.

11. A computer system, comprising:
at least one processor;
a communication interface; and
memory storing computer-readable instructions that, when executed by the at least one processor, cause the computer system to:
receive, by the at least one processor via the communication interface, from an administrative computing device, one or more security parameters for evaluating customer security preferences;
generate, by the at least one processor, based on the one or more security parameters for evaluating customer security preferences, at least one security score definition file;
receive, by the at least one processor via the communication interface, from a security dashboard computing platform, a request for a security score associated with a customer of a financial institution, the customer of the financial institution having a user account for accessing an online banking interface associated with the financial institution;
in response to receiving the request for the security score associated with the customer of the financial institution, request, by the at least one processor via the communication interface, from a customer portal computing platform configured to provide the online banking interface associated with the financial institution, one or more security preferences associated with the customer of the financial institution;
receive, by the at least one processor via the communication interface, from the customer portal computing platform, the one or more security preferences associated with the customer of the financial institution;
determine, by the at least one processor, based on the at least one security score definition file and based on the one or more security preferences associated with the customer of the financial institution, a security score for the customer of the financial institution; and
provide, by the at least one processor via the communication interface, to the security dashboard computing platform, the determined security score for the customer of the financial institution, wherein the security dashboard computing platform is configured to generate a security dashboard user interface for the customer of the financial institution based on the determined security score for the customer of the financial institution,
wherein the at least one security score definition file specifies one or more weighted criteria for evaluating customer security preferences,
wherein the one or more weighted criteria comprises an indication of an amount of time elapsed since a password change event associated with the user account of the customer of the financial institution, an indication of whether a one-time passcode is required at login for the user account of the customer of the financial institution, and an indication of whether a one-time passcode is required when responding to a challenge question for the user account of the customer of the financial institution, and
wherein the at least one security score definition file identifies one or more actions, and the computer system is configured to perform at least one action of the one or more actions identified by the at least one security score definition file based on a state of at least one security parameter of the one or more security parameters.

12. The computer system of claim 11, wherein the one or more weighted criteria comprises:
an indication of password strength for the user account of the customer of the financial institution;
an indication of whether the user account of the customer of the financial institution is enrolled in a security alert program; and
an indication of whether a customer device associated with the customer of the financial institution is loaded with a browser security plug-in.

13. The computer system of claim 11, wherein the memory stores additional computer-readable instructions that, when executed by the at least one processor, cause the computer system to:
receive, by the at least one processor via the communication interface, from the administrative computing device, one or more batch processing instructions for evaluating customer security preferences for a group of customers of the financial institution;
based on the one or more batch processing instructions, request, by the at least one processor via the communication interface, from the customer portal computing platform, one or more security preferences associated with the group of customers of the financial institution;
receive, by the at least one processor via the communication interface, from the customer portal computing platform, the one or more security preferences associated with the group of customers of the financial institution;
based on the one or more batch processing instructions, determine, by the at least one processor, based on the at least one security score definition file and based on the one or more security preferences associated with the group of customers of the financial institution, at least one security score for each customer included in the group of customers of the financial institution; and
store, by the at least one processor, the at least one security score for each customer included in the group of customers of the financial institution.

14. The computer system of claim 13, wherein the one or more batch processing instructions include a schedule for evaluating customer security preferences for at least one customer included in the group of customers of the financial institution.

15. The computer system of claim 13, wherein the one or more batch processing instructions include a schedule for determining an updated customer security score for at least one customer included in the group of customers of the financial institution.

16. The computer system of claim 11, wherein the one or more security preferences associated with the customer of the financial institution comprises a password associated with the customer of the financial institution and one or more one-time passcode preferences associated with the customer of the financial institution.

17. The computer system of claim 16, wherein the one or more security preferences associated with the customer of the financial institution comprises one or more security alert preferences associated with the customer of the financial institution and one or more browser security preferences associated with the customer of the financial institution.

18. The computer system of claim 16, wherein the online banking interface associated with the financial institution comprises one or more user interfaces that enable the customer of the financial institution to view account balance information associated with one or more financial accounts maintained by the financial institution, transfer funds between one or more accounts, and pay one or more bills.

19. One or more non-transitory computer-readable media storing computer-executable instructions that, when executed by a computer system having at least one processor and memory and a communication interface, cause the computer system to:

receive, by the at least one processor via the communication interface, from an administrative computing device, one or more security parameters for evaluating customer security preferences;

generate, by the at least one processor, based on the one or more security parameters for evaluating customer security preferences, at least one security score definition file;

receive, by the at least one processor via the communication interface, from a security dashboard computing platform, a request for a security score associated with a customer of a financial institution, the customer of the financial institution having a user account for accessing an online banking interface associated with the financial institution;

in response to receiving the request for the security score associated with the customer of the financial institution, request, by the at least one processor via the communication interface, from a customer portal computing platform configured to provide the online banking interface associated with the financial institution, one or more security preferences associated with the customer of the financial institution;

receive, by the at least one processor via the communication interface, from the customer portal computing platform, the one or more security preferences associated with the customer of the financial institution;

determine, by the at least one processor, based on the at least one security score definition file and based on the one or more security preferences associated with the customer of the financial institution, a security score for the customer of the financial institution; and provide, by the at least one processor via the communication interface, to the security dashboard computing platform, the determined security score for the customer of the financial institution, wherein the security dashboard computing platform is configured to generate a security dashboard user interface for the customer of the financial institution based on the determined security score for the customer of the financial institution, wherein the at least one security score definition file specifies one or more weighted criteria for evaluating customer security preferences, wherein the one or more weighted criteria comprises an indication of an amount of time elapsed since a password change event associated with the user account of the customer of the financial institution, an indication of whether a one-time passcode is required at login for the user account of the customer of the financial institution, and an indication of whether a one-time passcode is required when responding to a challenge question for the user account of the customer of the financial institution, and wherein the at least one security score definition file identifies one or more actions, and the computer system is configured to perform at least one action of the one or more actions identified by the at least one security score definition file based on a state of at least one security parameter of the one or more security parameters.

20. The one or more non-transitory computer-readable media of claim 19, wherein the one or more weighted criteria comprises:

an indication of password strength for the user account of the customer of the financial institution;

an indication of whether the user account of the customer of the financial institution is enrolled in a security alert program; and an indication of whether a customer device associated with the customer of the financial institution is loaded with a browser security plug-in.

* * * * *